(12) United States Patent
Eerkens

(10) Patent No.: US 10,050,721 B2
(45) Date of Patent: Aug. 14, 2018

(54) NEUTRINO COMMUNICATION SYSTEM

(71) Applicant: Jozef W. Eerkens, Woodland, CA (US)

(72) Inventor: Jozef W. Eerkens, Woodland, CA (US)

(*) Notice: Subject to any disclaimer, the term of this patent is extended or adjusted under 35 U.S.C. 154(b) by 605 days.

(21) Appl. No.: 14/166,100

(22) Filed: Jan. 28, 2014

(65) Prior Publication Data

US 2016/0226597 A1  Aug. 4, 2016

Related U.S. Application Data

(60) Provisional application No. 61/760,024, filed on Feb. 1, 2013.

(51) Int. Cl.

| | |
|---|---|
| *H04B 10/00* | (2013.01) |
| *H01S 1/00* | (2006.01) |
| *G01J 5/02* | (2006.01) |
| *G21G 1/00* | (2006.01) |
| *G01T 3/00* | (2006.01) |
| *H04B 10/90* | (2013.01) |
| *G09B 23/00* | (2006.01) |
| *H04B 13/00* | (2006.01) |
| *G21C 17/00* | (2006.01) |
| *H01S 3/0941* | (2006.01) |
| *G06Q 10/00* | (2012.01) |

(52) U.S. Cl.
CPC ............ *H04B 10/90* (2013.01); *G09B 23/00* (2013.01); *H04B 13/00* (2013.01); *G06Q 10/00* (2013.01); *G21C 17/00* (2013.01); *H01S 3/0941* (2013.01)

(58) Field of Classification Search
CPC .... H04B 10/70; H04B 10/503; H04B 10/564; H04B 10/615; H04B 10/80
USPC ........... 398/110–115; 250/251, 351; 376/153
See application file for complete search history.

(56) References Cited

U.S. PATENT DOCUMENTS

| | | | | |
|---|---|---|---|---|
| 4,205,268 A | * | 5/1980 | Eerkens ................ | H04B 13/00 250/251 |
| 4,303,343 A | * | 12/1981 | Patel .................. | G01N 21/1702 250/351 |
| 4,426,576 A | * | 1/1984 | Hurst .................... | H01J 49/162 250/283 |

(Continued)

*Primary Examiner* — Ken N Vanderpuye
*Assistant Examiner* — Abbas H Alagheband
(74) *Attorney, Agent, or Firm* — Temmerman Law Office; Mathew J. Temmerman

(57) ABSTRACT

An advanced communications system comprising an emitter and an improved receiver (detector) utilizing modulated beams of neutrino and antineutrino waves as information carriers between the emitter and the receiver. Generation of modulated neutrino and antineutrino beams in the emitter is achieved by a laser-like medium, while detection and demodulation of the neutrino and antineutrino beams is accomplished by a second laser-like medium which registers the flux (or fluence) of modulated neutrinos and antineutrinos passing there-through by means of resonant stimulated deexcitation of lasable excited states. In addition to the information transmission utilization, the neutrino emitter and receiver (detector) system may also be employed to gather information by the probing of internal earth structures. Such structures cause measurable refractions and retardations of the propagated pulses of monochromatic coherent neutrino waves traveling through the earth between the emitter and receiver (detector), at certain predetermined neutrino frequencies.

20 Claims, 11 Drawing Sheets

(56) References Cited

U.S. PATENT DOCUMENTS

| | | | | |
|---|---|---|---|---|
| 4,576,777 A * | 3/1986 | Weber | G01N 24/006 | 250/251 |
| 4,657,722 A * | 4/1987 | Bennett | C09K 5/044 | 376/105 |
| 4,732,728 A * | 3/1988 | Weber | G21C 17/00 | 250/251 |
| 4,974,230 A * | 11/1990 | Hemmati | H01S 3/09415 | 372/41 |
| 5,276,717 A * | 1/1994 | Weber | H04B 13/00 | 332/149 |
| 6,126,741 A * | 10/2000 | Jones | C30B 1/02 | 117/10 |
| 6,891,310 B2 * | 5/2005 | Beckwith | G01T 1/1606 | 310/311 |
| 7,893,414 B2 * | 2/2011 | Larsen | G21F 1/00 | 250/505.1 |
| 8,113,056 B2 * | 2/2012 | Drake, Jr. | G01N 21/1702 | 73/643 |
| 8,125,813 B2 * | 2/2012 | Nizin | A61N 5/1031 | 250/492.1 |
| 8,202,268 B1 * | 6/2012 | Wells | A61B 18/22 | 128/898 |
| 8,595,020 B2 * | 11/2013 | Marino | G01N 21/3504 | 705/1.1 |
| 8,849,565 B1 * | 9/2014 | Gutt | G01C 21/00 | 701/1 |
| 9,309,456 B2 * | 4/2016 | Zaitseva | G01T 1/203 | |
| 9,514,493 B2 * | 12/2016 | Marino | G01N 21/3504 | |
| 2002/0037066 A1 * | 3/2002 | Schaefer | B82Y 30/00 | 376/158 |
| 2003/0053580 A1 * | 3/2003 | Ross | G21K 1/00 | 376/156 |
| 2003/0226962 A1 * | 12/2003 | Lasky | G21K 1/00 | 250/251 |
| 2004/0027031 A1 * | 2/2004 | Beckwith | G01T 1/1606 | 310/311 |
| 2004/0059552 A1 * | 3/2004 | Ross | G21K 1/00 | 703/2 |
| 2004/0102939 A1 * | 5/2004 | Ross | G21K 1/00 | 703/2 |
| 2005/0118559 A1 * | 6/2005 | Zagyansky | G09B 23/06 | 434/284 |
| 2005/0182607 A1 * | 8/2005 | Ross | G21K 1/00 | 703/2 |
| 2005/0242275 A1 * | 11/2005 | Lasky | G21K 1/00 | 250/251 |
| 2006/0212280 A1 * | 9/2006 | Ross | G21K 1/00 | 703/2 |
| 2007/0025494 A1 * | 2/2007 | Beckwith | G21K 1/00 | 376/153 |
| 2009/0254321 A1 * | 10/2009 | Ross | G21K 1/00 | 703/6 |
| 2010/0260504 A1 * | 10/2010 | Takahara | H04B 10/5053 | 398/152 |
| 2011/0002689 A1 * | 1/2011 | Sano | H04B 10/69 | 398/44 |
| 2011/0036983 A1 * | 2/2011 | Ford | G01J 1/04 | 250/338.1 |
| 2011/0046928 A1 * | 2/2011 | Ross | G21K 1/00 | 703/2 |
| 2011/0062345 A1 * | 3/2011 | Paglieri | G01T 1/00 | 250/395 |
| 2011/0176815 A1 * | 7/2011 | Frankel | H04B 10/5053 | 398/184 |
| 2012/0075682 A1 * | 3/2012 | Amoroso | G06N 99/002 | 359/1 |
| 2012/0148235 A1 * | 6/2012 | Nishihara | H04B 10/07951 | 398/29 |
| 2012/0264024 A1 * | 10/2012 | Pelton | H01M 4/8605 | 429/401 |
| 2014/0288897 A1 * | 9/2014 | Ross | G06F 17/5009 | 703/2 |

* cited by examiner

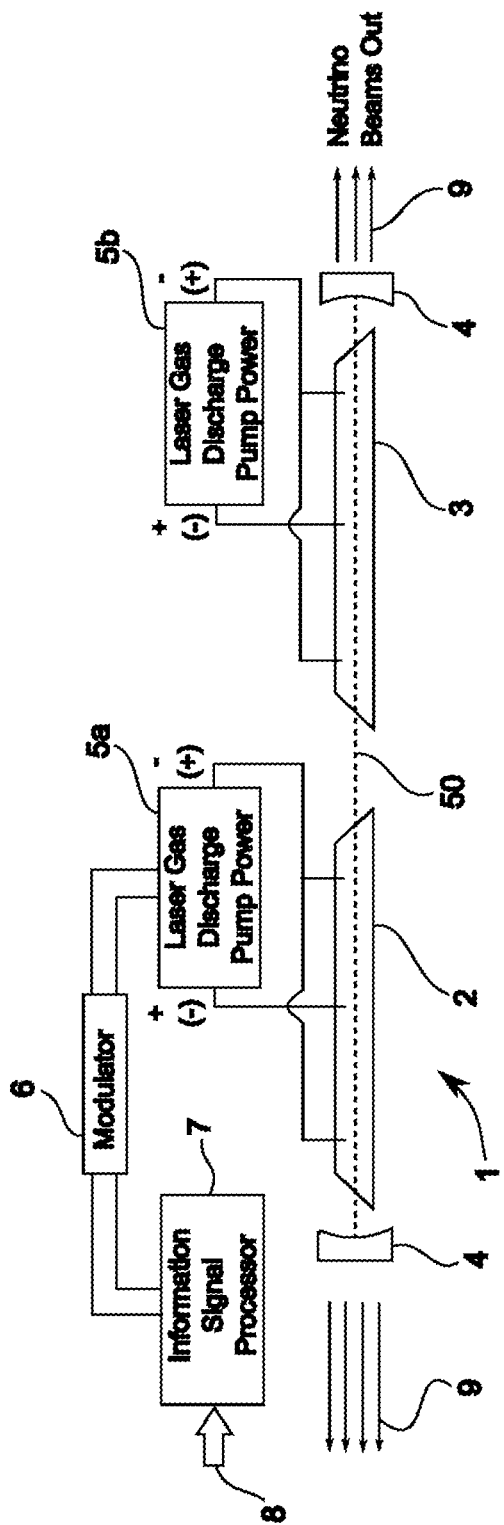
Fig. 1 Emitter

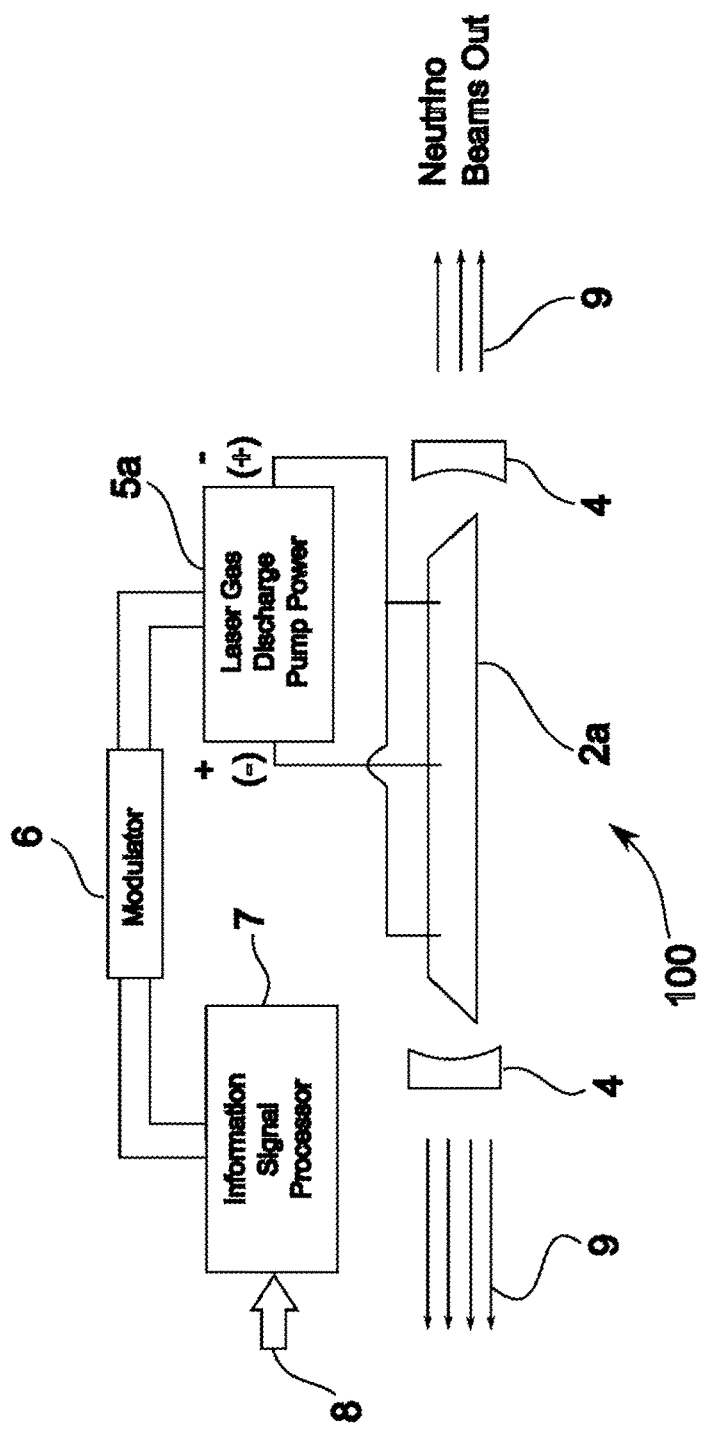
Fig. 1A Emitter

NEUTRINO COMMUNICATION SYSTEM

RELATED APPLICATIONS

This application claims priority from the U.S. provisional application with Ser. No. 61/760,024 filed on Feb. 1, 2013. The disclosure of the provisional application is incorporated herein as if set out in full.

BACKGROUND

Field of the Invention

This invention relates to the communications art and in particular to the transfer of information by means of beams of modulated coherent neutrino and antineutrino waves between an emitter and receiver (detector).

Description of Related Art

Since Marconi first demonstrated the feasibility of communicating with electromagnetic/photon waves in the kilo-Hertz frequency region, nearly all other practically accessible portions of the photon spectrum have been utilized for the transfer of information. Easily accessible frequency regions are extremely crowded at present and many specialized techniques, such as frequency modulation, amplitude modulation, pulse-duration modulation, phase modulation, polarization modulation, and the like, have been created to effect an increase in the capacity for the simultaneous transmission of information in these heavily used photon frequency regions.

To date, only massless, neutral photons are widely used for wirelessly sending information over large distances through the atmosphere and space. Two of the other known stable elementary particles, namely protons and electrons, are generally stopped in a very short distance within the atmosphere, and thus are not generally useful for wireless communications. Transmitting information by means of composites of elementary particles, i.e. atoms and molecules, is possible; and is equivalent to transmitting sound. Unfortunately, sound is attenuated relatively strongly in the atmosphere and in solid or liquid matter. Ordinarily sound, or the transmission of atomic and molecular displacements, is only useful for the atmospheric transmission of information over medium to short distances, or coarse probing of inhomogeneities in the earth's interior.

Neutrons, which are composed of a proton and an electron, might be considered for communications, but free neutrons are heavily absorbed by nuclei present in the atmosphere, and decay into a proton, electron, and neutrino within 20 minutes.

High-energy (MeV) neutrinos, which are commonly produced by the decay of particles generated in particle accelerators and fission reactors have been suggested as possible information carriers for communication, and for in-earth radiography. However, their high production cost and their poor detectability severely limit their usefulness for communication applications.

Use of more easily detectable low-energy (sub-MeV) neutrinos generated by lasers, as disclosed here, is many times more cost-effective and useful. While some of these low-energy neutrino applications were discussed in U.S. Pat. No. 4,205,268 entitled "Neutrino Communication Arrangement", issued May 27, 1980, the laser-like emitter and receiver (detector) apparatus disclosed in that patent are ineffective and inefficient.

As discussed above, other than the use of mass-less neutral photons and sound-waves, no practical low-cost wireless communication systems or earth interior probing systems using other basis carriers have been developed to date.

It is thus a first object of the present application to present an effective laser-driven low-energy neutrino emitter and receiver/detector that may be used for communication.

It is a further object of the present application to present a laser-driven low-energy neutrino emitter and receiver/detector wherein the emitter and receive/detector are configured so as to maximize the detection, with the receiver/detector, of neutrinos emitted from the emitter.

SUMMARY OF THE INVENTION

The present application discloses a new technique and system for the generation, modulation, and detection/demodulation of coherent monochromatic sub-MeV neutrino and antineutrino beams. An entirely new neutrino wireless communication system is thereby described which will alleviate some of the present crowding of the electromagnetic spectrum. The neutrino wireless communication system is also ideal for secure communications because it utilizes coherent directed beams whose exact location must be known for interception to be possible. In contrast to present electromagnetic communication systems, neutrino/antineutrino beam communications may be conducted through the earth, from one side to the other if desired, through bodies of water such as oceans and lakes, or through other solid or liquid matter. In addition to its use in communications, the low-energy neutrino system herein disclosed may be utilized for radiography of the earth's interior to locate ore bodies, oil deposits, aquifers and the like.

In U.S. Pat. No. 4,205,268, a method of neutrino communications was disclosed that relied on laser-like emitters and laser-like receivers (detectors), and in which the laser-like receiver's resonant frequencies equaled the resonant frequency of the laser-like emitters. That is to say that in the '268 patent, emitters and receivers (detectors) used the same lasable media with the same lasable resonant frequencies. This arrangement has since been found to be ineffective and inefficient. In the presently disclosed device and method, the laser frequency $\omega_d$ of the detector must be equal to half the frequency $\omega_e$ of the laser-like emitter, that is $\omega_d = \frac{1}{2} \omega_e$. This requires the use of different laser media for the emitter and detector.

Before discussing the details of the presently presented device and method, a short explanation of the basic physical concepts involved is warranted so as to allow a better understanding of the principles of operation.

The neutrino is one of four known stable elementary "quanticles" of physics, the other three being the photon, electron, and proton (free neutrons decompose in 20 minutes through beta decay into a proton, an electron, and a neutrino). Like the photon, the neutrino has no charge and has no (or a very small) mass. However, unlike the photon, the neutrino interacts only very weakly with matter and for this reason can travel through matter over very large distances. In photon absorptions or emissions by matter, an excited state is produced or de-excited in an atom or molecule in which energy, momentum and spin are conserved with integer spin changes of $\Delta S=0$, or $\pm 1$. As energy and momentum must be conserved, a single neutrino or antineutrino which has spin ½ (in units of $\hbar$), cannot participate in a quantum absorption or emission conversion process if the overall spin change must equal $\Delta S=0$, or $\pm 1$, unless the single neutrino can partner with an additional quanticle that has spin ½. Conversely, photons having integer spins S=0, or ±1, may easily participate in quantum absorption or emission events.

These differences between photons and neutrinos explain why photons cannot, but neutrinos can pass through the earth unimpeded. Note however that neutrinos may be refracted and retarded by inhomogeneities in massive bodies. This allows for probing of the earth using neutrinos. For example, by use of two neutrino beam emitters with different frequencies, and by pulsing them simultaneously while scanning over an ore body, one can determine the ore body's extent by registering small differences in arrival times or displacements at two corresponding adjacent detectors.

Nuclear particle research has discovered three classes of neutrinos; one type is emitted in beta (electron) decay, one is emitted in muon (heavy electron) decay, and one is emitted in tauon (super-heavy electron) decay. They are labeled $v_e$, $v_\mu$, and $v_\tau$. Each has a corresponding antiparticle which we label $\underline{v}_e$, $\underline{v}_\mu$, and $\underline{v}_\tau$. Most observed neutrinos are $v_e$ neutrinos, emitted by nuclear reactions in the sun, which are found to have left-handed spins ½ℏ along their directions of motion. Neutron decay in nuclear fission reactors produces mostly antineutrinos $\underline{v}_e$, which have right-handed spins ½ℏ along their direction of propagation.

Neutrinos are difficult to detect. Today, high-energy (MeV) anti-neutrinos emitted by nuclear reactors can be detected via "inverse beta decay" events in which a proton inside a hydrogen nucleus meets an antineutrino and converts into a neutron and a positron (high energy positive electron), written in short-hand $\underline{v}+p\rightarrow e^++n$. Here $\underline{v}$ represents an antineutrino, p is a proton, $e^+$ is a positron, and n is a neutron. In this absorptive case, spin is conserved by the positron $e^+$ which has S=½. Because nuclei are much smaller than atoms or molecules, the encounter cross-sections for such events are many millions times smaller than interactions of photons with atoms or molecules. The neutrons and positrons produced in these inverse-beta-decay events can therefore be detected only by surrounding tons of a hydrogen-containing material like water with thousands of scintillation detectors. By such means, it is possible to indirectly detect twenty to a hundred reactor antineutrinos per day, while trillions of antineutrinos per second pass through the proton-bearing water mass. Besides the low intercept cross-section, the "inverse-beta-decay" reaction has a kinematic threshold of 1.8 MeV for anti-neutrinos, below which it can not take place. Thus only MeV antineutrinos can be observed. For the detection of neutrinos emitted by the sun and stars, inverse intra-nuclear reactions employing enormous masses of chlorine or gallium are used with similar MeV cut-off energies. Thus, at present, only neutrinos and antineutrinos with MeV energies can be observed. However it is known that the energy spectrum of (anti)neutrinos varies continuously, and that anti-neutrinos emitted by fission reactors range from 0 to about 8 MeV. To reiterate, (anti)neutrinos below about 1 MeV are unobservable with present detection techniques.

In contrast to the well-studied MeV neutrinos, in the present disclosure we consider the less studied low-energy electron neutrinos of sub-MeV energy. These neutrinos are mass-less electron-neutrinos that travel at the speed of light, like photons, as was observed in a 1987 super-nova explosion. We show, in the present application, how one can generate, modulate, and detect/demodulate monochromatic coherent beams of such neutrinos/(anti)neutrinos as a means of wireless transmission of information. From here on, we shall use the word "neutrino" and "antineutrino" solely for low-energy mass-less electron neutrinos, and drop subscript "e".

While the absorption or emission of a single neutrino via molecular material emissions or absorptions is impossible because of spin conservation violation, the stimulated photon emission (SE) by an (anti)neutrino of an excited quantum state (exciton) of a material atom or molecule is not impossible since it is of electromagnetic origin, provided its undulation frequency is resonant with that of the exciton. In such an SE interaction, the stimulating (anti)neutrino is not absorbed, but it continues its travel while inducing the emission of a photon with the same resonant frequency. The fly-by (i.e. presence) of a neutrino can thus be observed by detection of the photon that is emitted in the SE process. While mankind has been aware of absorption and emission processes for several centuries, the third SE photon-matter interaction was not known until Einstein first proposed it in 1917. Originally it was poorly understood and believed to have only a minor effect, until it was utilized in 1960 in the first working laser device.

To create low-energy neutrinos, it is postulated that in a pumped-up lasing medium, where resonant laser photons stimulate excited states (excitons) to promote secondary coherent photons with the same frequency, it is possible that instead of a secondary photon, occasionally a neutrino-antineutrino pair (labeled a v$\underline{v}$ pair) is created which recoil in the same or opposite directions along the stimulating laser photon's direction, carrying equal energies and undulation frequencies. Such a v$\underline{v}$ pair production obeys all conservation laws. Its creation probability is second-order (i.e. weaker) compared to photon creation, that is instead of a catalytic conversion of two quanta, it involves three quanta (1 exciton→1 neutrino+1 antineutrino), like in Raman photon conversions.

Using the symbol γ for a photon of any energy ($10^{-6}$ eV through $10^9$ eV) and X* for a lasable excited atom or molecule, the generation of neutrinos and antineutrinos in an emitter laser can be represented in short-hand by the formulas:

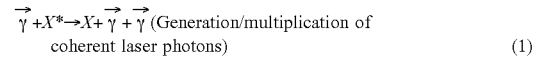
$\vec{\gamma}+X^*\rightarrow X+\vec{\gamma}+\vec{\gamma}$ (Generation/multiplication of coherent laser photons)   (1)

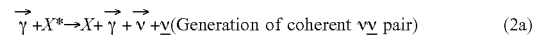
$\vec{\gamma}+X^*\rightarrow X+\vec{\gamma}+\vec{v}+\underline{v}$ (Generation of coherent v$\underline{v}$ pair)   (2a)

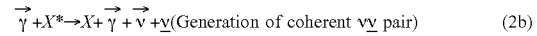
$\vec{\gamma}+X^*\rightarrow X+\vec{\gamma}+\vec{v}+\underline{v}$ (Generation of coherent v$\underline{v}$ pair)   (2b)

The non-neutrino relation (1) is included here to show the usual photon multiplication in a lasing medium, whose probability is many orders of magnitude higher than the v$\underline{v}$ pair production probability of Eq (2a) and (2b). The propagation directions of interacting quanticles on both sides of the arrow signs in Eq (1) and (2a) are aligned but in (2b), v and $\underline{v}$ recoil in the opposite direction. In reaction (2a) and (2b), the undulation frequencies $\omega_v$ and $\omega_{\underline{v}}$ of the neutrino and antineutrino are equal and half the value of the undulation frequency $\omega_\gamma$ of incoming stimulating photons. That is:

$\omega_v=\omega_{\underline{v}}=½\omega_\gamma=½\in_\star/\hbar=½\omega_e$   (3)

Eq (3) obeys conservation of energy which demands that $\hbar\omega_v+\hbar\omega_{\underline{v}}=\in_\star=\hbar\omega_\gamma$. Here $\in_\star$ is the de-excitation (exciton) energy in a lasable atom or molecule X*, and $\hbar\omega_v$ and $\hbar\omega_{\underline{v}}$ are the energies of a mass-less neutrino and antineutrino; and $\omega_\gamma=\omega_e$ is the laser photon frequency of the neutrino generator/emitter. Furthermore, simultaneous conservation of momentum and spin imposes the condition that $\hbar\omega_v/c = \hbar\omega_\gamma/c$ for antineutrinos and neutrinos. That is, their undulation frequencies must be equal, resulting in Eq (3). This can happen if the emitted neutrino with spin S=−½ is balanced by an antineutrino with spin S=+½, which occurs if they are emitted in the same direction with equal linear momenta recoiling from the de-exciting atom or molecule, or if they recoil off each other in opposite directions with opposite linear momenta. Here neutrinos are assumed to propagate with left-handed spins and antineutrinos with right-handed spins. Both are mass-less neutrinos with either a left- or right-handed spin, just like photons can be circularly polarized left- or right-handedly. In the remainder of this document the word "neutrinos" shall refer to both neutrinos and antineutrinos unless a distinction is required for clarification.

Detection of neutrinos and antineutrinos created in conversion reaction (2) may be achieved by the SE interactions:

$$\vec{v}+Y^* \rightarrow \vec{v}+Y+\vec{\gamma} \text{ (Detection of neutrino v)} \quad (4)$$

$$\vec{\underline{v}}+Y^* \rightarrow \vec{\underline{v}}+Y+\vec{\gamma} \text{ (Detection of antineutrino \underline{v})} \quad (5)$$

The SE-produced photon γ in (4) or (5) may be detected by a photo-detector, thus signaling the fly-by of a neutrino or antineutrino. Because the undulation frequencies $\omega_v=\omega_{\underline{v}}=\frac{1}{2}\omega_\gamma$ in the laser emitter, the neutrino laser detector must operate at half the frequency of the emitter. The detector laser is therefore generally different from the emitter laser as indicated by the symbol Y instead of X in (4) and (5), and thus:

$$\omega_d = \frac{1}{2}\omega_e = \in_d/\hbar = \frac{1}{2}\in_e/\hbar = \frac{1}{2}\in_\star/\hbar \quad (6)$$

The word "laser," as used above, and in the following discussion denotes any device involving lasable media with populations of excited states from which coherent beams of photons may be extracted by stimulated emission. More specifically a device with the acronym "Raser" denotes photons at Radio-wave frequencies ranging from 1 Hz to 100 MHz; "Masers" for photons at Microwave frequencies ranging from 1 MHz to 1 THz; "Lasers" for photons at Light frequencies ranging from 1 THz to $10^6$ THz; and GRasers for Gamma-Ray photons at frequencies ranging from $10^6$ to $10^9$ THz. The letters "aser" in these acronyms stands for "Amplification of Stimulated Emission of Radiation." Suitable lasing materials for neutrino generation can be chosen from the large body of known gaseous, liquid, or solid laser media.

For neutrino-pair productions via the SE process (2), one may calculate (based on quantum-mechanics) that the ratio of the rates for v$\underline{v}$ pair generation versus photon (γ) generation is:

$$(k_{v\underline{v}}/k_\gamma)_{SE}=0.94 \times 10^{-7} \langle y_\star \rangle^2 \in_\star^2, \quad (7)$$

$\in_\star (=\in_e)$ is the energy released in units of eV for the lasable de-excitation transition in the laser emitter medium, and $\langle y_\star \rangle$ is the displacement matrix element for the transition in units of Angstroms (Å). The latter equals the dipole moment transition element $\langle \mu_\star \rangle$ divided by electron charge, that is $\langle y_\star \rangle = \langle \mu_\star \rangle/e$. For example for a neodymium emitter laser with wavelength $\lambda_e=1.06$ μm, one has $\langle y_\star \rangle \sim 1$ Å and $\in_\star \sim 1$ eV, so that $(k_{v\underline{v}}/k_\gamma)_{SE} \sim 10^{-7}$, while for the $CO_2$ laser with $\lambda_e=10.6$ μm, one has roughly $\langle y_\star \rangle \sim 1$ Å and $\in_\star \sim 0.1$ eV, so that $(k_{v\underline{v}}/k_\gamma)_{SE} \sim 10^{-9}$. That such a small number of v$\underline{v}$ pairs are generated is probably why v$\underline{v}$ pair generation has remained unnoticed to date.

To generate sufficiently strong coherent neutrino beams, it is necessary to employ high-power lasers. This can be achieved by using either a "closed-cavity" continuous emitter laser with near 100% reflectivity end mirrors, or by a high-power pulsed laser. With 100% reflectivity end mirrors, the standing-wave intracavity photon flux inside a continuous laser can reach very high levels and is only limited by diffraction and residual mirror losses (and by neutrino energy losses). Neutrino beam fluxes, which escape unattenuated through the mirrors, are thus at high levels, being proportional to the circulating laser photon flux. As utilized hereinafter, the word "mirror" denotes the particular structure required to retro-direct and maintain the high internal standing wave flux of photons in the laser cavity. For masers and lasers (infrared, visible, and ultraviolet), ordinary mirrors are used, but for rasers an antenna-like structure is required.

As an alternative to "closed-cavity" lasers, pulsed lasers can be used to obtain high laser power levels. Pulsed lasers can have peak power levels that are several orders of magnitude higher than in continuous lasers, because pumped lasable excitation energy is stored between pulses and released all at once during a short pulse. According to Eq. (7), a MW-peaked Nd laser pulse with a peak flux of $6 \times 10^{24}$ photons $cm^{-2}$ $s^{-1}$ generates a laser-beam-overlapping pulsed beam of $6 \times 10^{17}$ neutrinos $cm^{-2}$ $s^{-1}$. This beam comprises a 50-50 mix of monochromatic coherent neutrinos and antineutrinos which exit unrestricted through the end mirrors of the laser.

The probabilities governing detecting coherent resonant neutrinos via processes (4) and (5) are much more favorable than those governing generating neutrinos in a laser device. The rate of stimulating a photon by a passing neutrino can be calculated from the relation:

$$k_{v \rightarrow \gamma}=4.9 \times 10^{-13} \langle y_\star \rangle^2 \in_\star'[\in(\omega_v=\omega_\star')/\Delta\omega_\star'], s^{-1}, \quad (8)$$

Here $\langle y_\star \rangle$ is again in Angstrom units, $\in_\star'$ is in eV, and $\omega_\star'=\in_\star'/\hbar=\in_d/\hbar$ is the lasing frequency of the detection laser in Hz. $\Delta\omega_\star'$ is the contour width of the detection laser resonance in wave-number units of $cm^{-1}$, while $\in(\omega_v=\omega_\star')$ is the neutrino flux (neutrinos $cm^{-2}$ $s^{-1}$) incident on the excited laser medium of the detector. A prime is placed here on the detector frequency $\omega_\star'=\omega_d$ to distinguish it from the frequency $\omega_\star=\omega_e$ of the emitter. Relation (8) is obtained from quantum physics and is similar to the stimulated photon emission rate from excited states by resonant photons in a laser:

$$k_{\gamma \rightarrow \gamma}=4.9 \times 10^{-13} \langle y_\star \rangle^2 \in_\star'[\in(\omega_\gamma=\omega_\star')/\Delta\omega_\star'], s^{-1}, \quad (9)$$

That is, for both resonant neutrinos and photons, stimulated emission rates are proportional to their incident fluxes $\in_v$ and $\in_\gamma$. Quantum Mechanics calculations leading to Eqs (7)-(9) are discussed in a paper titled "On the Possible Production and Detection of Coherent Epithermal Neutrino BeamsAppl. Phys. B(2013), 111, p 323-331, which is hereby incorporated herein as if set out in full.

In order for the neutrino beam to be detectable, the frequency $\omega_v$ of the monochromatic neutrino beam with flux $\omega_v = \in(\omega_v)$ produced by the emitter laser must be resonant with the laser frequency $\omega_\star'=\omega_d$ of the detector, and preferably be close to the peak of its resonance contour with width $\Delta\omega_\star'$. As mentioned, the frequency of the detection laser should be half of that of the emitter laser, so $\omega_\star'=\omega_d=\frac{1}{2}\omega_\star=\frac{1}{2}\omega_e=\omega_v=\omega_{\underline{v}}$ or in terms of wavelengths $\lambda_\star'=\lambda_d=2\lambda_\star=2\lambda_e=\lambda_v=\lambda_{\underline{v}}$ since $\lambda=2\pi c\omega$. For example a neodymium-doped yttrium-aluminum garnet $(Nd:Y_3Al_5O_{12})$ laser emitter operated at wavelength $\lambda_e \approx 1.0615$ μm, can be paired with a holmium-doped erbium/thulium-yttrium-aluminum garnet $(Ho:ErTmY_3Al_5O_{12})$ detector laser, tuned to operate at $\lambda_d \approx 2.123$ μm. Detection is optimized if the holmium laser runs weakly near threshold while the neodymium emitter laser is operated with highest possible output. For example in the earlier example of a pulsed neodymium peak laser flux of $6 \times 10^{24}$ photons $cm^{-2}$ $s^{-1}$, the accompanying pulsed neutrino peak output of $6 \times 10^{17}$ neutrinos $cm^{-2}$ $s^{-1}$ can be detected by a weakly lasing holmium laser aligned with the neutrino beam. The circulating photon flux of $\sim 10^{16}$ photons $cm^{-2}$ $s^{-1}$ inside a milliwatt holmium laser will be greatly perturbed and show a spiked increase followed by a spiked dip on a photo-detector. The photo-detector will signal the fly-through of a $6 \times 10^{17}$ neutrinos $cm^{-2}$ $s^{-1}$ flux which overwhelms the normal photon-induced SE rate of $10^{16}$ photons $cm^{-2}$ $s^{-1}$ in the holmium laser and can thereby demodulate any modulated information imparted by the emitter on the neutrino beam.

Another possible laser emitter/detector pair for neutrino communications would be a CO emitter laser which emits a series of rovibrational lasing lines in the vicinity of $\lambda_e = 5.3$ μm and a $CO_2$ detector laser with a multitude of rovibrational lines around $\lambda_d = 10.6$ μm. Again, the $CO_2$ detector laser should be operated near threshold while the CO emitter laser should be operated at the highest possible power level. For example the CO laser line at $\lambda_e = 5.44239$ μm produced by CO's lasable rovibrational transition (v=11, J=13)→(v=10, J=12) is nearly coincident with half of the wavelength $\lambda_d = 10.88473$ μm produced by the lasable $CO_2$ rovibrational transition ($v_3 = 1$, J=46)→($v_1 = 1$, J=45). Here J represents the rotational quantum number of a CO or $CO_2$ molecule, and v is their vibrational quantum number, with $v_1$ and $v_3$ designating vibrational quantum numbers for the first and third vibrational mode respectively of triatomic $CO_2$. A number of other laser lines with near-coincident $\lambda_d \approx 2\lambda_e$ can be found for the CO/$CO_2$ pair of lasers. Besides the CO/$CO_2$ and neodymium/holmium laser-empowered emitter/detector pairs, many other laser pairs with $\lambda_d \approx 2\lambda_e$ exist which can be used in neutrino communication systems.

In communication applications, digitally coded information may be impressed upon the outgoing neutrino beams by pulse-duration modulation, amplitude modulation, frequency modulation, phase modulation, polarization modulation, or any other known modulation technique. Whether or not the neutrino beam is emitted continuously or in pulses, information-carrying modulation may be impressed on it via the emitting laser's gaseous-electron-discharge current control, or (flashed) pump-lamp power, or pump-diode discharge circuitry; or it may be imposed by laser mirror alignment-misalignment modulations, or by internally placed modulated wave interrupting devices, which will modulate the internal standing-wave lasing intensity. The emitted neutrino beam intensity is proportional to the internal laser standing-wave intensity, thus the emitted neutrino beam intensity is modulated in turn.

Instead of an emitter comprising one laser medium in which modulated neutrino beams are generated, in some applications it may be more convenient to align two separate pumped-up lasable structures inside one laser resonator cavity. The function of the first one, referred to as the pilot laser, is to employ pump power or frequency bandwidth modulation to impart information to be transmitted, while the second laser called the amplifier laser, amplifies and maximizes laser power, and thus the modulated neutrino beam output. Both lasers are optically coupled and generally resonant to the same laser frequency, but they are pumped separately and may have different densities of lasable atoms or molecules so as to optimize modulation in the pilot laser and maximize the neutrino beam flux in the amplifier laser.

After the neutrino beam travels unobstructed, including through any material bodies present, the information carried by an emitted neutrino beam is retrieved by processes (4) and (5) in a beam-aligned beam-covering detector/receiver laser, in which SE-produced photons are produced and measured so as to recover the modulation of the incident neutrino beam. The outputs from a photo-detector that monitors the receiver are electronically amplified and all modulated information extracted and retrieved therefrom. Care must be taken that a weakly lasing receiver is well shielded from any stray photons to which it is resonant so that it only responds to fly-through resonant neutrinos. The receiver's photo-detector or monitor must likewise be receptive only to the receiver's internal laser photon flux and not to any stray light or induced wall-electricity noises. This may be achieved, for example, by enclosing the receiver and its photo-monitor inside a light-tight box and operating the photo-detector with isolated DC batteries.

For communication of information through the earth, it is preferable to select a neutrino frequency which is not, or at least is only minimally affected by internal earth materials that may cause refractions. Conversely, for internal earth mapping applications the opposite would be the case in that it would be preferable to employ neutrino frequencies which experience strong refraction. The neutrino beam emitter and receiver herein described may thus be utilized to gather information on the earth's internal composition, as well as to transmit information. For communications over large distances, it is important that the neutrino beam be as tight as possible. This may be promoted by using resonator optics in the laser emitter so that it generates a nearly non-divergent intracavity laser beam and thus nearly non-divergent neutrino beam. In the laser state-of-the-art, such beams are known as Bessel, Hermite-Gaussian, and Laguerre-Gaussian laser beams. Clearly many other valuable applications utilizing coherent monochromatic neutrino beams can be envisioned and it is appreciated that the devices and methods described in this application may be used for diverse applications.

In one embodiment the improved communication system comprises a first emitter means employing a laser for generating a first coherent neutrino-antineutrino beam in a first direction, and a first receiver means employing a laser aligned with said first emitter means and in neutrino-antineutrino beam receiving relationship therewith for receiving the first coherent neutrino-antineutrino beam and generating a first detectable output signal in response thereto, and the receiver means has a laser frequency of half the frequency of the laser utilized in the emitter means.

In a further embodiment of the improved communication system the first emitter means further comprises modulation means for modulating the coherent neutrino-antineutrino beam to impress predetermined information thereon, and the first receiver means further comprises a demodulation means for demodulating the neutrino-antineutrino beam and the detectable output signal contains the predetermined information.

In a further embodiment of the improved communication system the modulation comprises a modulation of the class consisting of amplitude modulation, pulse duration modulation, frequency modulation; phase modulation, and polarization modulation.

In a further embodiment of the improved communication system the emitter means further comprises a pair of spaced apart resonator mirrors reflectively aligned in the first direction, an emitter laser medium intermediate the pair of spaced apart resonator mirrors for generating emitter laser photons in the first direction, and the pair of resonator mirrors is substantially 100% reflective for the emitter laser photons.

In a further embodiment of the improved communication system the emitter laser medium is comprised of a semiconductor diode.

In a further embodiment of the improved communication system the modulation means comprises a modulated current power supply means.

In a further embodiment of the improved communication system the modulation means further comprises motion producing means connected to at least one of the at least one of the pair of resonator mirrors for moving the at least one resonator mirror to provide modulation of the generated laser photons.

In a further embodiment of the improved communication system the laser medium is a gas; and the system further comprises an electric discharge means for generating an electric discharge in the laser medium for pumping the laser medium, and the laser medium generating the photons in response to the electric discharge.

In a further embodiment of the improved communication system the electric discharge is pulsed; and further comprises an electron beam generating means for subjecting the laser medium to an electron beam during the pumping thereof.

In a further embodiment of the improved communication system the emitter laser medium is one of a gas, liquid and a solid, and the system further comprises a pumping lamp means for generating a pumping electromagnetic radiation, and the emitter laser medium is aligned in pumping electromagnetic radiation receiving relationship to the pumping lamp and generates laser photons in response to receipt of the pumping electromagnetic radiation.

In a further embodiment of the improved communication system the pumping lamp means is positioned adjacent to the emitter laser medium; and further comprises elliptical, specular reflecting means around the pumping lamp and the laser medium for directing substantially all of the pumping electromagnetic radiation onto the laser medium.

In a further embodiment of the improved communication system the emitter medium is selected from any atomic, ionic, or molecular lasable gas, liquid, or solid medium listed in the laser literature.

In a further embodiment of the improved communication system the system further comprises a pilot laser medium and an amplifier laser medium aligned therewith; and a pair of spaced apart resonator mirrors in laser photon receiving relationship to the pilot and amplifier laser media for receiving the laser photons and generating the neutrino-antineutrino pair beam in response thereto.

In a further embodiment of the improved communication system the modulation means further comprises an electric field generating means for generating an electric field in regions containing one of the pilot and amplifying laser media; a power supply means for powering the electric field generating means; and a means for varying the power generated by the power supply means to thereby vary the electric field.

In a further embodiment of the improved communication system the modulation means further comprises a magnetic field generating means for generating a magnetic field in regions containing one of the pilot and amplifying laser media, a power supply means for powering the magnetic field generating means; and a means for varying the power generated by the power supply means to thereby vary the magnetic field.

In a further embodiment of the improved communication system the pilot and amplifier laser media are selected from any atomic, ionic, or molecular lasable gas, liquid, or solid medium listed in the laser literature.

In a further embodiment of the improved communication system the receiver means further comprises a pair of spaced apart aligned receiver resonator mirrors, a receiver laser medium positioned intermediate the pair of resonator mirrors for generating receiver laser photons having a predetermined flux intensity, and a first of the pair of resonator mirrors reflecting substantially all of the receiver laser photons and the second of the pair of resonator mirrors having a predetermined transmission of the receiver laser photons; and photon sensitive means connected to the demodulation means for detecting the receiver laser photons transmitted through the second of the pair of resonator mirrors.

In a further embodiment of the improved communication system the system further comprises a pumping means for pumping the receiver laser medium to cause generation of the receiver laser photons therefrom.

In a further embodiment of the improved communication system the receiver laser medium is selected from any atomic, ionic, or molecular lasable gas, liquid, or solid medium listed in the laser literature.

In a further embodiment of the improved communication system the receiver laser means is responsive to the emitter neutrino-antineutrino beam and varies the laser flux intensity of the receiver photons in response thereto.

In a further embodiment of the improved communication system the lateral dimension of the receiver is larger than the lateral dimension of the emitter means.

In a further embodiment of the improved communication system the path length of the receiver photons is folded in the receiver means.

In a further embodiment of the improved communication system the system further comprises a second emitter means for generating a second coherent neutrino-antineutrino beam in the first direction and adjacent the first emitter means, an emitter turntable means for supporting the first and the second emitter means for rotation about a first axis substantially perpendicular to the first direction, a second receiver means aligned with the second emitter means and in neutrino-antineutrino beam receiving relationship therewith and mounted adjacent the first receiver means, for receiving the second neutrino-antineutrino beam and generating a second detectable output signal in response thereto, a receiver turntable means for supporting the first and the second receiver means for rotation about a second axis substantially perpendicular to the first direction, and the frequency of the neutrino-antineutrinos in the first neutrino-antineutrino beam is different from the frequency of the neutrino-antineutrinos in the second neutrino-antineutrino beam.

In a further embodiment of the improved communication system the system further comprises a second emitter means for emitting a second neutrino-antineutrino beam in a second direction substantially parallel to the first direction and mounted adjacent the first receiver means, a second receiver means for receiving the second neutrino-antineutrino beam and generating a second detectable output signal in response thereto, and the second receiver means is mounted adjacent the first emitter means.

In a further embodiment of the improved communication system the first neutrino-antineutrino beam is different from the second neutrino-antineutrino beam.

In another embodiment the coherent neutrino-antineutrino beam generating arrangement comprises a pair of spaced apart resonator mirrors, an emitter laser medium intermediate the pair of spaced apart resonator mirrors and aligned to emit photons in a direction aligned with the pair of resonator mirrors, a modulation means coupled to the emitter laser medium for inducing a modulated coherent beam of photons, and a modulated coherent beam of photons generating a modulated coherent neutrino-antineutrino beam, and the neutrino-antineutrinos having a second predetermined frequency, and a receiver means for detecting and demodulating the modulated coherent neutrino-antineutrino beam.

In a further embodiment of the coherent neutrino-antineutrino beam generating arrangement the modulation means further comprises means for moving at least one of the pair of resonator mirrors.

In a further embodiment of the coherent neutrino-antineutrino beam generating arrangement the laser medium comprises a single homogeneous medium within which the neutrino-antineutrino beam is generated.

In a further embodiment of the coherent neutrino-antineutrino beam generating arrangement the laser medium comprises a pilot laser medium aligned with a separate laser amplifier medium positioned in a spaced apart relationship; and the laser amplifier medium generates substantially most neutrino-antineutrinos.

In a further embodiment of the coherent neutrino-antineutrino beam generating arrangement the laser medium is selected from any ionic, atomic, molecular lasable solid, gas, or liquid material listed in the laser literature.

In a further embodiment of the coherent neutrino-antineutrino beam generating arrangement the modulation means further comprises frequency modulation means.

In a further embodiment of the coherent neutrino-antineutrino beam generating arrangement the modulation means further comprises amplitude modulation means.

In a further embodiment of the coherent neutrino-antineutrino beam generating arrangement the modulation means further comprises polarization modulation.

In a further embodiment of the coherent neutrino-antineutrino beam generating arrangement the modulation means further comprises phase modulation.

In a further embodiment of the coherent neutrino-antineutrino beam generating arrangement the modulation means further comprises pulse duration modulation.

In a further embodiment of the coherent neutrino-antineutrino beam generating arrangement the pulse duration modulation comprises one of pulse width modulation and pulse spacing modulation.

In another embodiment the neutrino-antineutrino beam receiver arrangement comprises a pair of spaced apart aligned receiver resonator mirrors, a receiver laser medium for generating receiver photons for reflection between the pair of resonator mirrors, and a first of the pair of resonator mirrors reflective for substantially all of the receiver photons and the second of the pair of resonator mirrors having a predetermined partial transmission for the receiver photons, a photon sensitive means adjacent the second resonator mirror for detecting the receiver photons transmitted through the second resonator means, the receiver photons and the laser medium being responsive to the passage of a resonant neutrino-antineutrino beam through the laser medium; and an output signal generating means coupled to the photon sensitive means for generating a detectable output signal in response to the detected receiver photons.

In a further embodiment of the neutrino-antineutrino beam receiver arrangement the neutrino-antineutrino beam is modulated carrying predetermined information impressed thereon; and the output signal generating means further comprises demodulation means for demodulating the detectable output signal in response to the modulated neutrino-antineutrino beam to provide the predetermined information therein.

In a further embodiment of the neutrino-antineutrino beam receiver arrangement the receiver laser medium is operated at or near the lasing threshold level.

In another embodiment a method of operating a communication system comprises the steps of generating a coherent neutrino-antineutrino beam, receiving the coherent neutrino-antineutrino beam, and generating a detectable output signal in response to the reception of the coherent neutrino-antineutrino beam by the receiver.

In a further embodiment of the method of operating a communication system the method further comprises the steps of modulating the coherent neutrino-antineutrino beam to impress predetermined information thereon, and demodulating the coherent neutrino-antineutrino beam to retrieve the information content, and generating the detectable output signal having the predetermined information content therein.

In a further embodiment of the method of operating a communication system the method further comprises the step of modulating the coherent neutrino-antineutrino beam in one of amplitude modulation, phase modulation, pulse spacing modulation, pulse duration modulation, frequency modulation and polarization modulation modes.

In a further embodiment of the method of operating a communication system the coherent neutrino-antineutrino beam is generated by a laser-powered emitter; and the coherent neutrino-antineutrino beam is received by a laser-powered receiver whose laser photon frequency equals half the photon frequency of the laser-powered emitter.

BRIEF DESCRIPTION OF THE DRAWINGS

The foregoing aspects and many of the attendant advantages of the invention will become more readily appreciated as the same becomes better understood by reference to the following detailed description, when taken in conjunction with the accompanying drawings, wherein:

FIG. 1 is a schematic diagram of a first embodiment of an emitter of the present application for emitting a coherent beam of neutrinos and antineutrinos;

FIG. 1A is a schematic diagram of a second embodiment of an emitter of the present application;

DETAILED DESCRIPTION OF THE INVENTION

Figure 2:
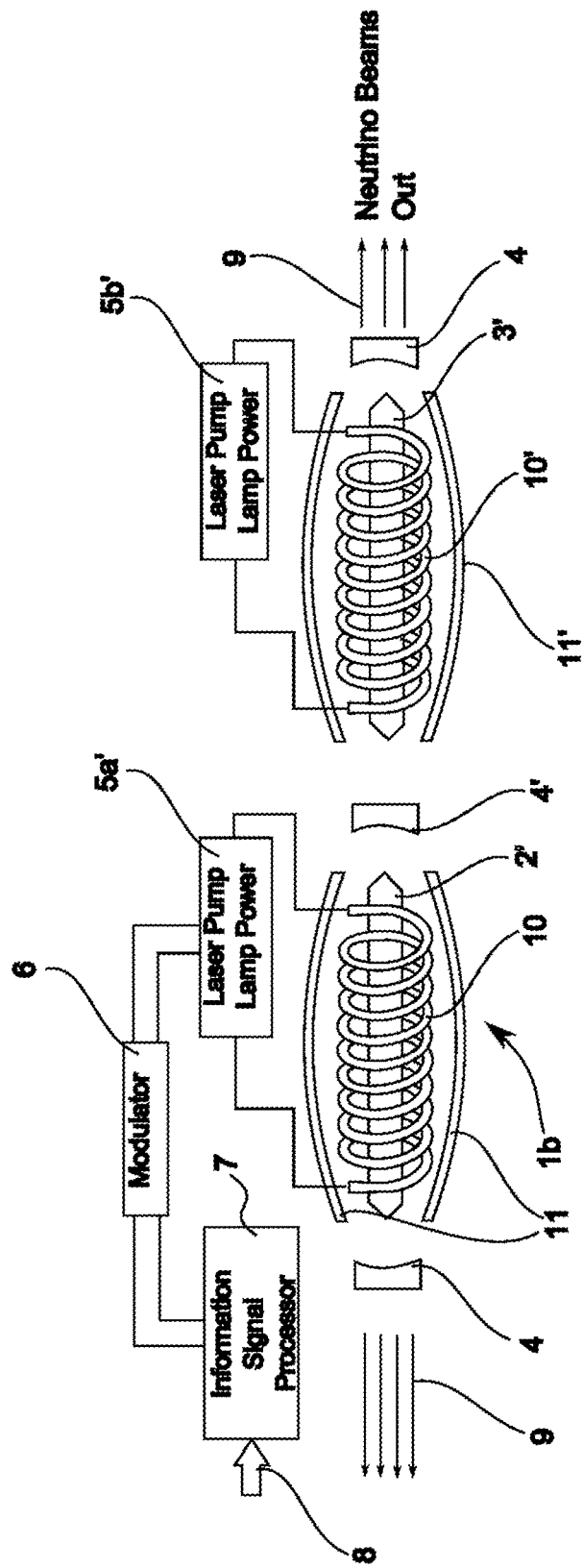
FIG. 2 is a schematic diagram of a third embodiment of an emitter of the present application.

The following description is presented to enable a person of ordinary skill in the art to make and use various aspects and examples of the present invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown.

The physical processes on which the present invention is based are described above. Turning first to FIG. 1, a schematic diagram of one embodiment of the emitter 1 of the present invention is shown. Emitter 1 comprises a pilot laser medium 2 and a laser amplifier medium 3, which are aligned along the axis 50 of the laser medium 2. Both the pilot laser medium 2 and the laser amplifier medium 3 are contained within suitable containers and are placed between two laser resonator mirrors 4 whose reflectivity for the laser photons is substantially 100%. Neutrino-antineutrino pairs are generated in both the laser media 2 and 3 through the interaction of the laser photons with pumped resonant excited states in laser media 2 and in laser media 3, resulting in the emission of a neutrino-antineutrino beam 9.

Laser media 2 and 3 may be pumped separately by discharge power supplies 5a and 5b and the densities of lasable atoms or molecules in 2 and 3 are generally different so as to optimize the impression of modulated information-carrying signals on the laser photon flux in medium 2 and to maximize laser power generation and thus neutrino-antineutrino beam emission in medium 3.

The laser media 2 and 3 shown in FIG. 1 may be excited gaseous plasmas pumped by an electric discharge, and aided if desired, by an electron beam or by beta particles emitted from a radioactive wall-coating of a pure beta emitter surrounding the laser gas to improve gaseous discharge conductivity. One or more of the laser media 2 and 3 may be pulse-pumped or pumped continuously depending on the application. The pump power supplies for the discharges in laser media 2 and 3 are designated 5a and 5b respectively. The output current or voltage from pump power supply 5a applied to laser medium 2 is modulated by the modulator 6 which is controlled by the information signal processor 7. The laser medium 2 is generally pumped at low power levels and its lasing frequency line-width is controlled to optimize the impartation of modulated information, while laser medium 3 is pumped at higher excitation rates to amplify and maximize overall laser power and thereby maximize the neutrino beam output. Information in the form of speech (sound) or video (letters, movies, television, etc.) or general data stored on magnetic media, optical storage, solid state storage, random access memory, or any other data storage or conveyance 8 and is fed to the signal processor 7 for transmission by the modulated neutrino beam. Modulation may be achieved by pulse-duration or amplitude modulation, or by any other modulation technique known in the art. The gaseous laser media 2 and 3 may contain one or more of the many lasable gases known in the art. One or more of these known gases or gas mixtures may be used to successfully practice the invention. While the laser media 2 and 3 shown in FIG. 1 are both gaseous and pumped by electric discharges, in some applications, the pilot laser medium 2, instead of being gaseous, may be a solid, liquid, or diode-like laser medium operated as shown in FIGS. 2 and 3, producing lasing photons and neutrinos of the same resonant frequency as those generated by the gaseous laser medium 3.

Turning to FIG. 1a, a second embodiment of the emitter 100 of the neutrino communication system is shown. Instead of two separate laser media 2 and 3 as shown in FIG. 1, in this embodiment a single laser medium 2a is used to produce modulated neutrino beams. The resonator mirrors 4 are placed directly at the ends of medium 2a. It will be appreciated that the pumping and modulation arrangement shown in FIG. 1 may also be utilized, as shown as information signal processor 7, modulator 6, and laser gas discharge pump power 5a, in the second embodiment 100 as shown in FIG. 1A. Similarly, the single medium 2a shown in FIG. 1A may also be utilized in place of separate media 2, 2', 2" and 3, 3', 3" shown in the other embodiments of the neutrino beam generator described below in connection with FIGS. 2, 3, 4, 5, 6, 7, and 8.

Figure 3:
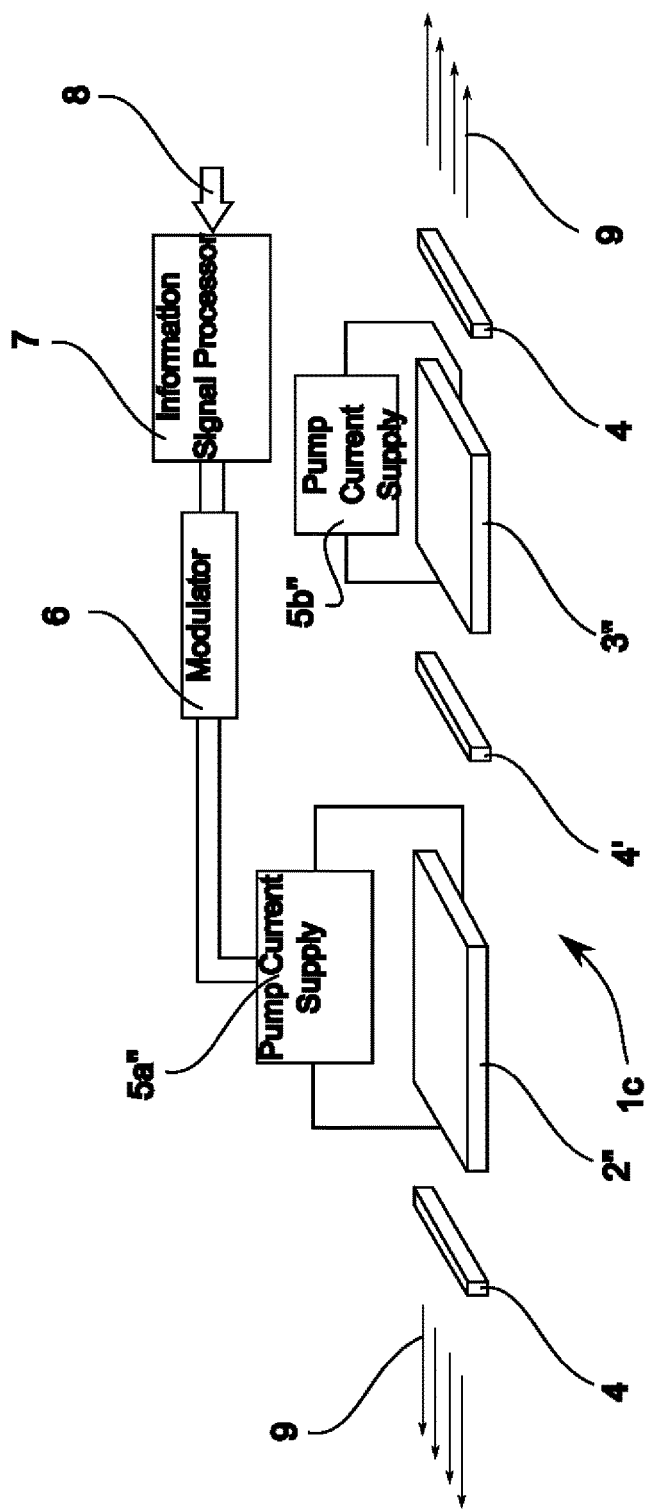
FIG. 3 is a schematic diagram of a fourth embodiment of an emitter of the present application.

Turning to FIG. 2, a third embodiment of the neutrino emitter 1b is shown, comprising laser media 2' and 3'. Laser media 2' and 3' comprise solid or liquid hosts in which ions or atoms are dispersed that can be excited by pump light photons emitted from surrounding pump lamps 10 and 10', which in turn are enclosed by specular reflectors 11 and 11' that reflect and focus pump light photons onto laser media 2' and 3' to be trapped and be absorbed therein. Instead of a pump lamp, pump photons may alternatively be provided by laser diodes whose output beams are arranged to overlap laser media 2' and 3'. Power for the pump lamps 11 and 11' (or laser diode) is supplied by power supplies 5a' and 5b'. The current or voltage output in 5a' for laser 2' is controlled and modulated by a modulator 6 onto which information 8 is supplied by information processor 7. Laser 2' is generally utilized to optimize information impression on the modulated laser and neutrino fluxes, while the main function of laser media 3' is to amplify the intra-cavity laser flux and thereby the emitted neutrino beam.

Concentrations and arrangements of lasable ions or atoms in laser media 2' and 3' are generally different, but both produce laser photons with the same resonant frequency. The laser media 2' and 3' are generally optically aligned cylinders placed jointly inside an optical resonator cavity having resonator mirrors 4 with substantially 100% reflectivity placed at the ends of the cavity to retain lasing photons in laser media 2' and 3'. The remaining components of the system are generally the same as those in the embodiment shown in FIG. 1. While the laser media 2' and 3' shown in FIG. 2 are solid or liquid, pumped by pump-lamps (or laser diodes), in some embodiments, the pilot laser medium 2', instead of being a solid or liquid, may be a gaseous or diode-like laser medium operated as shown in FIG. 1 or FIG. 3, producing lasing photons of the same resonant frequency as those generated by the solid or liquid laser medium 2'. Instead of separate laser media 2' and 3', in some applications a single solid or liquid laser body may be used for generating neutrino beams, and in such a case one of the resonator end mirrors 4' is placed at the end of a single cylindrical laser, comprising only laser media 2'.

Turning to FIG. 3, a fourth embodiment of the emitter 1c is shown. In this embodiment the laser medium comprises a semiconductor diode material 2", pumped by a modulated current power supply 5a". Laser-driven emitter 1c may comprise a modulatable pilot laser 2" pumped by current supply 5a" and laser amplifier 3" pumped by current supply 5b", both laser bodies being aligned and placed between laser resonator mirrors (or mirrored surfaces) 4. Alternatively, emitter 1c may only consist of the laser medium 2" placed between resonator mirrors 4 and 4'. The semiconductor laser diode as defined here includes VCSEL (Vertical Cavity Surface Emitting Laser) lasers and other special constructions of lasable semiconductor materials. Materials utilized in semiconductor diode and diode-like lasers may be any laserable compound known in the art such as those listed in the extensive laser literature. The remaining designated components and optional arrangement variations of the emitter 1c of FIG. 3 are essentially the same as described above in relation to FIGS. 1, 1a, and 2.

Figure 4:
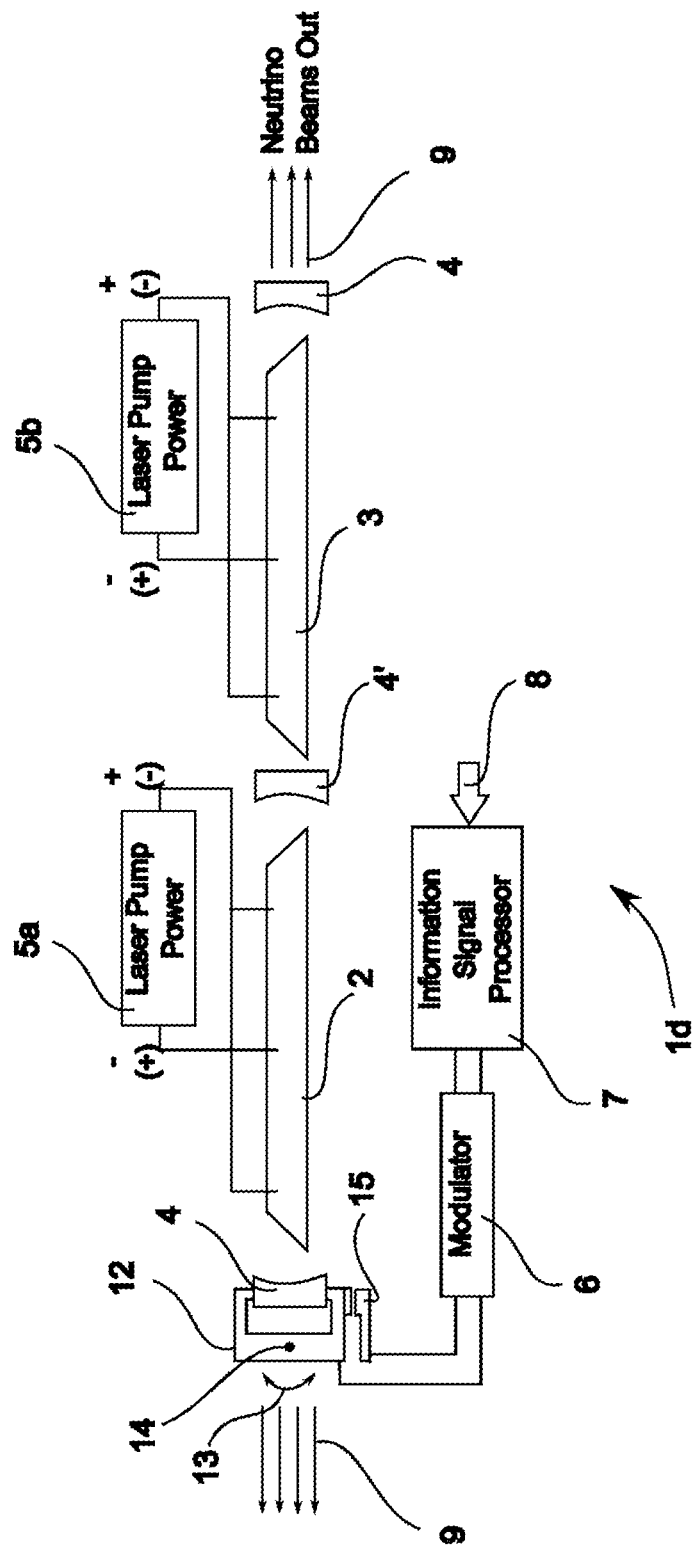
FIG. 4 is a schematic diagram of a fifth embodiment of an emitter of the present application.

Turning to FIG. 4, a fifth embodiment of the emitter 1d is shown. In this embodiment, modulation is imposed on the internal laser photon wave and thence on the emitted neutrino beam by means of rocking or oscillating one of the resonator mirrors 4 with a micro-adjustable mirror holder 12. As shown in FIG. 4, the mirror holder 12 may be rocked back and forth as designated by arrows 13 about a pivot 14 by a push-pull electromagnet designated 15 which is activated by the modulator 6. Other well-known devices such as piezoelectric vibrators may also be used to vibrate or oscillate one of the mirrors 4 such that the laser resonator goes out-of and into resonance, thereby modulating the laser photon standing wave and thereby the emitted neutrino beam. The remaining components of the system of FIG. 4 are the same as the embodiment shown in FIG. 1. While the fifth embodiment of FIG. 4 shows electric-discharge-pumped gaseous lasers 2 and 3, in their place, laser media consisting of lamp- or diode-pumped solid or liquid lasers as shown in FIG. 2, or electric-current-pumped diode lasers as shown in FIG. 3, may be used to similar effect, with laser and neutrino beam modulations provided by controlled rocking or oscillation of one of the resonator end mirrors 4. While the fifth embodiment shown in FIG. 4 shows a pilot laser medium 2 and separate amplifier laser 3, as in the previous figures, a single laser medium 2 placed between resonator mirrors 4 and 4' may be used instead.

Figure 5:
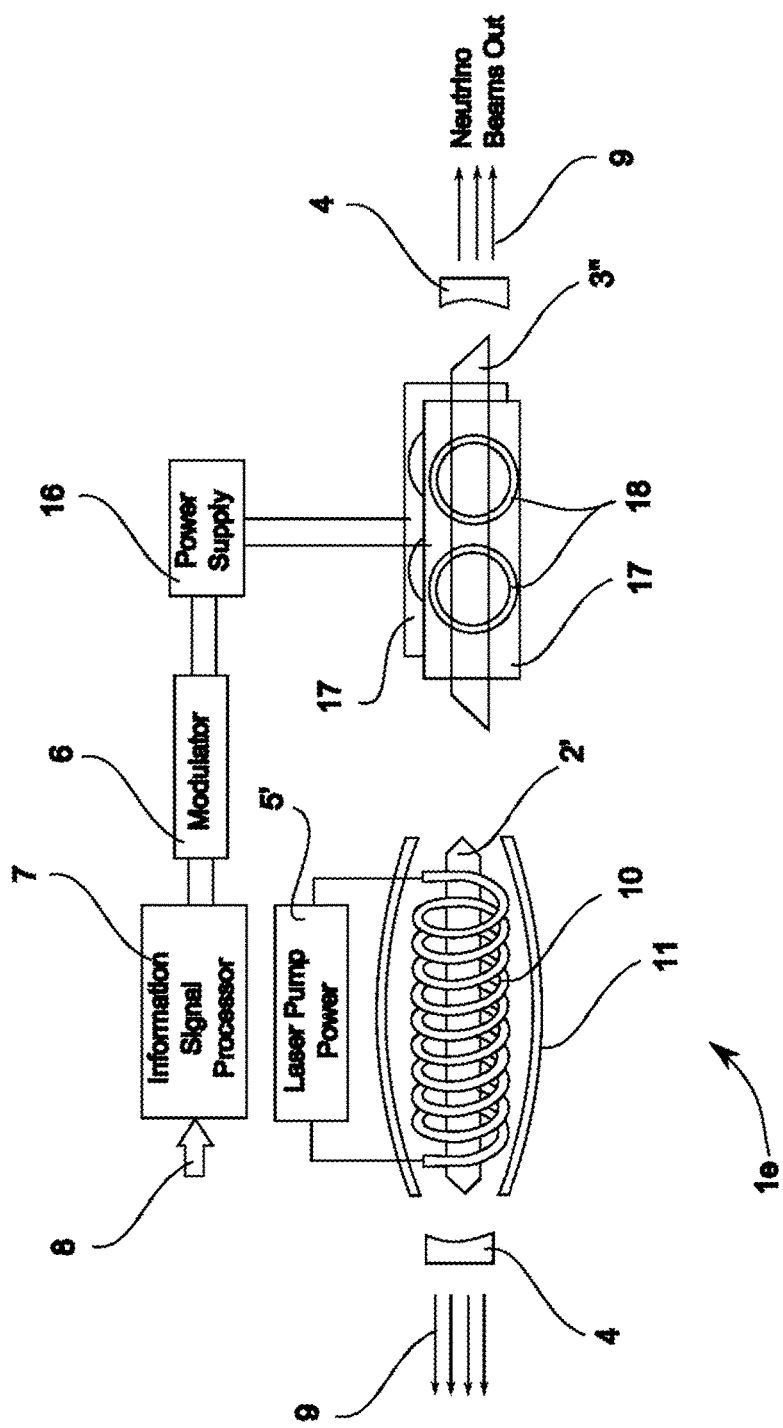
FIG. 5 is a schematic diagram of a sixth embodiment of an emitter of the present application.

Turning to FIG. 5, a sixth embodiment of the emitter 1e is shown. This embodiment employs still another means for imposing information modulation on the emitted neutrino beam. In this embodiment of the emitter 1e, a modulated oscillatory electric field is applied to a solid, liquid, or gaseous laser medium 3", which due to the Stark Effect, causes the excited energy levels in medium 3" to shift and oscillate slightly, thereby modulating the laser frequency and thence the neutrino beam frequency. The modulated electric field is imposed on two capacitor plates 17 between which the laser media 3" is placed. Instead of a modulated electric field, a modulated magnetic field may be imposed across laser medium 3" by means of electromagnets 18 which causes Zeeman shifts of the lasing energy levels and allow frequency modulation over the width of the Zeeman splitting. Modulation induced in laser medium 3" in turn will impose modulation of the intracavity laser beam in 2' and 3" and the neutrino beam 9.

In a further embodiment, acoustic modulation may be applied to the laser medium 3" via an electro-acoustic transducer attached to medium 3", which causes laser-active ions, atoms, or molecules to undergo controlled vibrations and modulations, which modulations are transferred to the laser and neutrino beams. Power for the modulated electric or magnetic fields, or for the acoustic transducer, is supplied by power supply 16, which is controlled by modulator 6 which receives its instructions from processor 7, as described above with respect to the first four embodiments of the emitter.

Further means of modulation may include, but not be limited to, modulating a quarter-wave plate, a Pockels cell, or other well-known electro-optic modulating device placed internally in the resonator cavity so that the standing-wave laser photons pass through it and are modulated by it.

It will be appreciated that in pulse modulation techniques, which may be used in the present invention, pulse duration modulation as well as time duration between pulses, or a combination thereof, may be utilized as desired in particular applications.

In various embodiments of the present invention, in both the emitter and the receiver as required, modulated pump photons may be supplied by a lamp, another laser, or a general light source or particle source with the appropriate energies.

In some embodiments of the emitter shown in FIG. 5, the material 3" may be chosen to possess magneto-optic or electro-optic (Kerr Effect) properties so that when the electric field is applied by means of plates 17 or the magnetic field by means of electromagnets 18, the direction of polarization of the laser photons is rotated. By modulating the electric or magnetic field and by placing a polarizer plate with a fixed direction of polarization in the cavity (Brewster angle surfaces in the laser resonator usually provide this), the internal laser photon wave and thus the emitted neutrino beam can be modulated.

Figure 6:
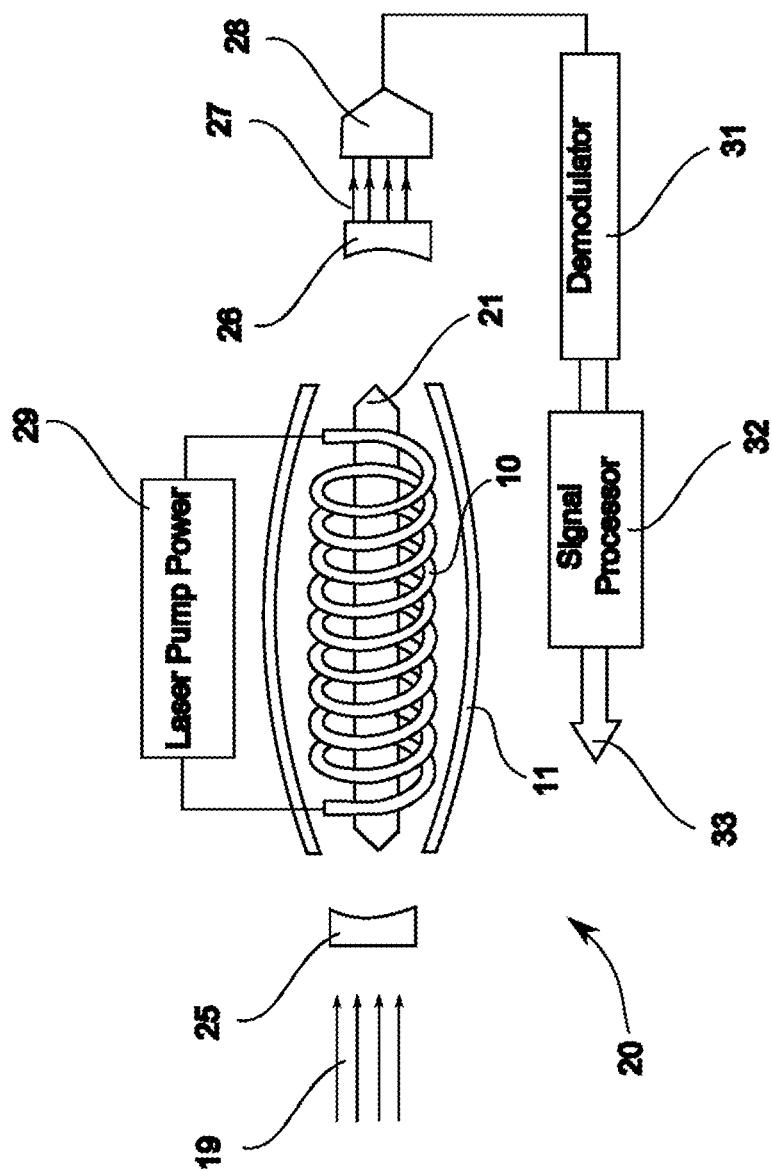
FIG. 6 is a schematic diagram of a first embodiment of a receiver of the present application to detect a coherent beam of neutrinos and antineutrinos.

Turning to FIG. 6, a schematic diagram of a first embodiment of a coherent neutrino beam receiver 20 is shown. This embodiment 20 comprises a laser medium 21, whose operating laser frequency generally has a value that is half that of the operating laser frequency of an emitter whose neutrino beam 19 it is configured to detect. Laser 21 is generally operated/pumped at or slightly below laser threshold so as to maximize the signal of an incoming resonant modulated neutrino beam 19. The incoming resonant modulated neutrino beam 19 enhances the stimulated de-excitation rate of resonant lasing species in laser medium 21 and thereby the laser photon generation rate in laser medium 21. Resonator mirror 25 has a reflectivity of substantially 100%, while the other resonator mirror 26 transmits partially (for example between 1% and 20%) so that the transmitted modulated laser output beam 27 can be measured and recorded by a photosensor 28. The laser photon flux in receiver 20 is enhanced due to neutrino-stimulated emissions in laser medium 21 and is modulated in proportion to the modulated resonant neutrino beam 19 that passes through the receiver. The partially transmitted modulated laser beam 27 monitored by photosensor 28 has its impressed modulation extracted or decoded by demodulator 31 which in turn passes decoded modulation signals on to signal processor 32 for final information retrieval. The receiver laser 21 depicted in FIG. 6 is a solid laser pumped by a laser pump lamp 29 surrounded by a specular reflector 11 similar to the emitter laser shown and described in FIG. 2.

Figure 7:
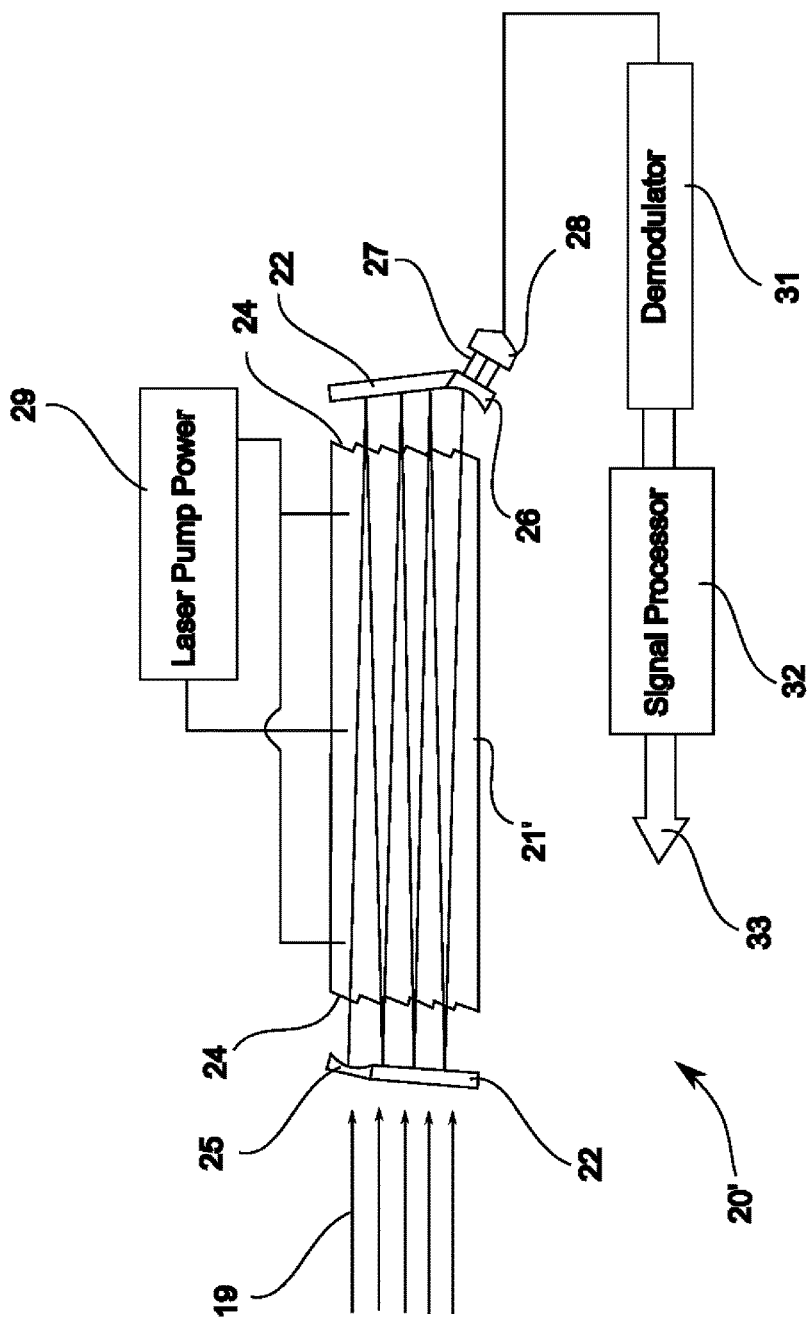
FIG. 7 is a schematic diagram of a second embodiment of a receiver of the present application.

Turning to FIG. 7, a schematic diagram of a second embodiment of a coherent neutrino beam receiver 20' is shown. This embodiment 20' comprises a gaseous laser generally designated 21' with a long-path intra-cavity laser beam, whose operating laser frequency generally has a value that is half that of the operating laser frequency of an emitter whose neutrino beam 19 it is configured to detect. Any one or a mixture of several of gaseous lasable gases as known in the art may be used. Often, an incoming coherent modulated neutrino beam 19 (which for example may be the beam 9 shown in FIGS. 1-5) is spread out due to diffraction effects after leaving the emitter 1 and traversing large distances through the air, earth, mountains, or oceans. The neutrino beam intercept region is therefore made larger by making the lateral dimensions of the laser medium 21' of the receiver 20' extensive to allow overlap of as much of an incoming neutrino beam as possible. In the embodiment 20' shown in FIG. 7, this is accomplished by folding the internal laser photon beam path many times via tilted resonator mirrors. In the illustration, the photon beam traverses the gaseous laser medium 21' via multiple entries and exits through windows 24, followed by reflections from a pair of external tilted mirrors. To avoid multiple window entries and exits, if allowed, the tilted mirrors may also be placed inside the gaseous enclosure in direct contact with non-pumped ("dead") regions of the otherwise discharge-excited laser gas. Other well-known photon-beam path folding techniques such as the use of a White or Herriott mirrors arrangement may be used in place of the tilted-mirror-pair method shown in FIG. 7. Internal laser beam path folding and spreading techniques in receivers to overlap the largest possible incoming neutrino flux from a distant neutrino beam source, may of course be utilized in any of the receiver embodiments described herein.

Figure 8:
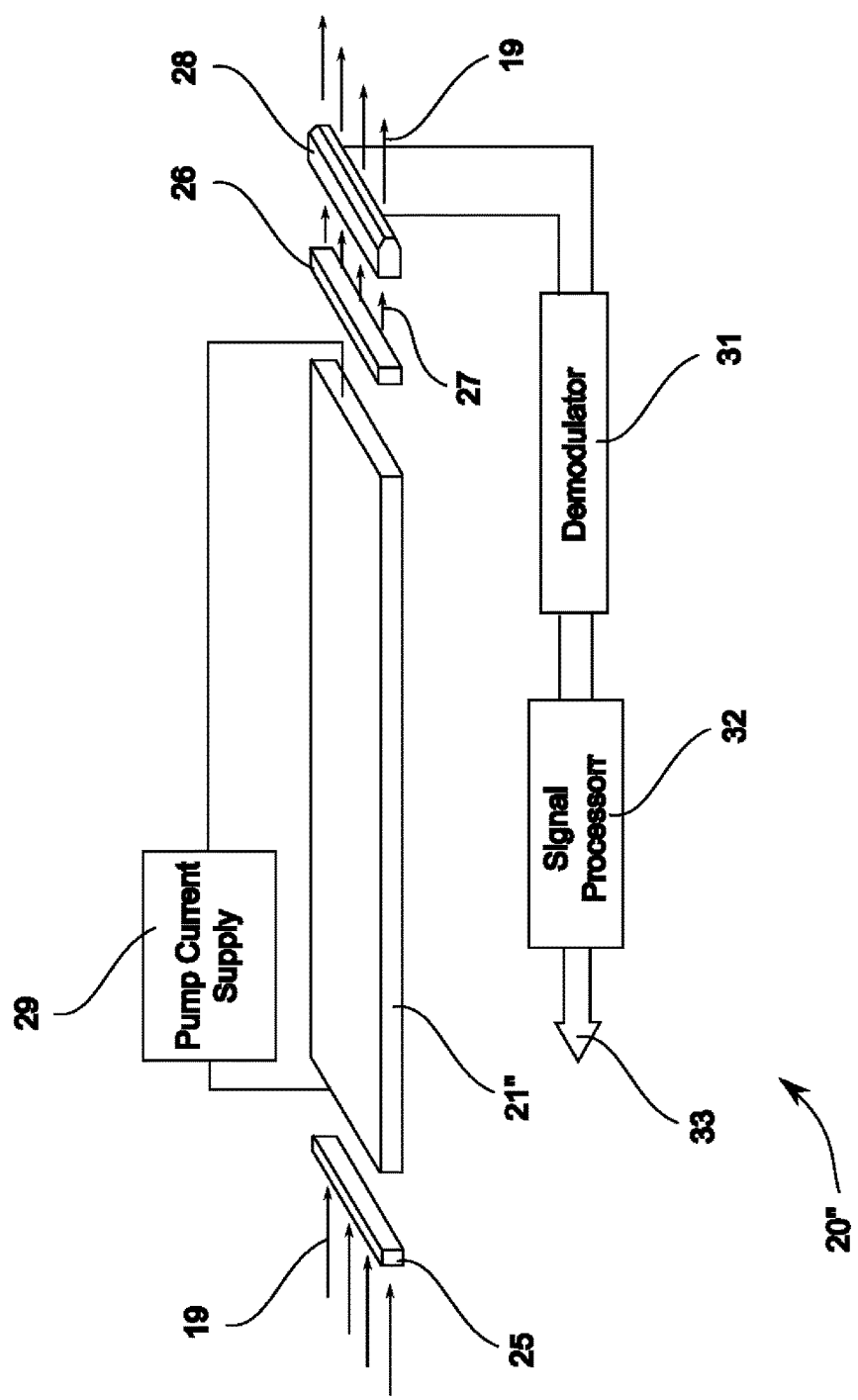
FIG. 8 is a schematic diagram of a third embodiment of a receiver of the present application.

While FIG. 7 shows the utilization of a laser gas to provide a large neutrino beam intercept volume, FIG. 8 shows how a solid or liquid laser medium might be arranged to overlap a broad neutrino flux. In laser medium 21", a series of spread-out optically coupled solid laser diodes, or a long string of diode-pumped laser fiber(s) doped with laser-active ions, atoms or molecules, are present and dispersed over a large receiver volume to cover and interact with a broad incoming neutrino beam 19. A long lasable solid fiber, which is strung out three-dimensionally in volume-filling spirals in medium 21", might for example be deployed. Laser diodes are dispersed through the fiber maze to keep the laser fiber pumped up. As before, the excited ions, atoms or molecules in laser medium 21" will sense a resonant modulated beam 19 of neutrinos and antineutrinos via enhanced stimulated de-excitations, and generate a detectable output signal in response thereto. This output signal will be commensurate with the sophistication of the modulation technique employed in the beam 19 and can provide a detectable output signal having all the information contained in the neutrino beam. In certain applications however, it is sufficient that the generated detectable output signal merely indicate the presence and/or intensity of the neutrino-antineutrino beam 19 without providing the full information content therein. Resonator end mirrors 25 and 26 are shown in FIG. 8 to be outside the laser medium 21". However, they may be polished terminal end mirrors of a long fiber whose 100% reflective mirror 25 and whose 1%-20% transmitting output mirror 26 may be much smaller than the width of laser medium 21", being integrated with medium 21". Laser sensor 28 which monitors the output from mirror 26 may accordingly be also much smaller than indicated in FIG. 8.

Figure 9:
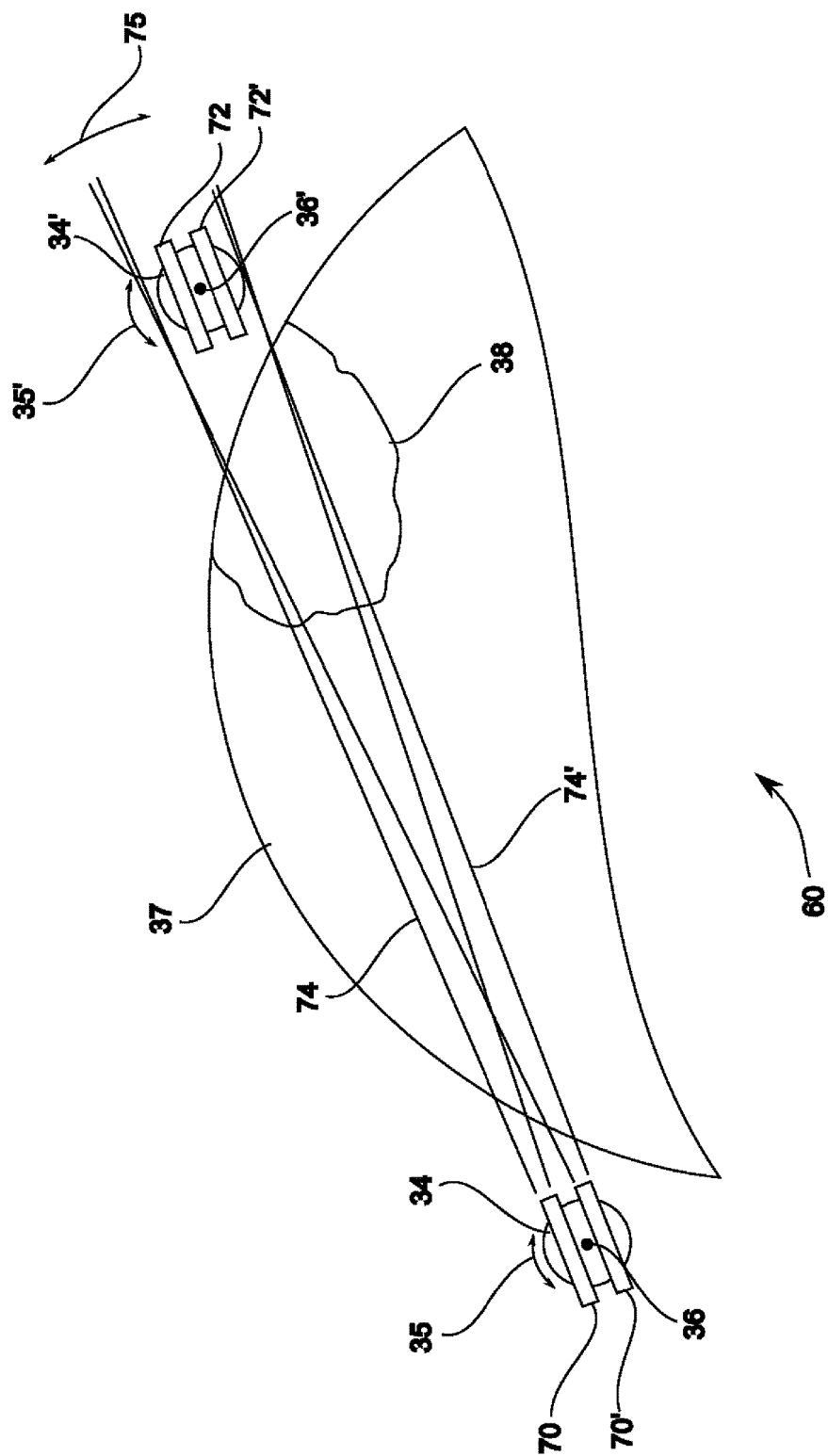
FIG. 9 is a schematic diagram showing one application of an emitter and receiver system as presented in the present application.

Turning to FIG. 9, a schematic diagram of an arrangement 60 of two neutrino communication systems, as discussed above, is shown. In the arrangement 60 the first neutrino communications system comprises an emitter 70, which may be similar to any of the above described emitter embodiments shown as 1, 100, 1b, 1c, and 1d described above, and a receiver 72 which may be similar any of the above described receiver embodiments 20, 20', 20" described above. The receiver 72 generally employs a laser medium whose operating frequency equals half the laser operating frequency utilized in emitter 70 as discussed above. The emitter 70 is furthermore operated so that the frequency of the emitted neutrino beam experiences a strong retardation for certain ore bodies 38 when traveling through such inclusions in the earth 37. In contrast, emitter 70' whose beam is detected by receiver 72' (operated with a laser at half the laser frequency of 70') emits a neutrino beam whose frequency is different from that utilized in emitter 70 and receiver 72, such that it travels with less retardation through ore bodies 38. By recording and analyzing the difference in neutrino travel times between beams from the emitter/detector pair 70-72, and the emitter/detector pair 70'-72', the contour and extent of the mineral inclusion or ore body 38 may be determined.

In the arrangement 60 shown in FIG. 9, the emitters 70 and 70' are mounted side by side on a turntable means 34, which can be turned in both directions as designated by the arrow 35 about a pivot 36 in the center of the turntable means 34. The two neutrino beam emitters 70 and 70' thus act as a double-barreled gun and are triggered to emit pulses of coherent neutrino beams simultaneously.

Due to diffraction and refraction, the neutrino beams 74 and 74' will spread and after they have traversed a distance on the order of one earth radius they will cover the receivers 72 and 72' which are mounted side by side on a second turntable means 34' which can be turned in both directions as shown by the arrow 35' about the pivot 36'. This second turntable means 34' with the receivers 72 and 72' thereon is positioned in neutrino-beam receiving relationship to the turntable means 34 having the emitters 70 and 70' thereon and oriented so that a portion of the earth 37 whose composition is to be analyzed and which may contain an ore body or mineral deposit 38, is between the emitters 70 and 70' and receivers 72 and 72'. The emitted neutrino beam 74 from emitter 70 detected by receiver 72 takes a different amount of time in traveling from emitter 70 to receiver 72 than the neutrino beam 74' emitted by emitter 70' which is detected by the receiver 72'. By measuring the difference in arrival time of the two neutrino beams 74 and 74' pulses using standard techniques, it is possible to deduce the extent of any ore body or mineral deposit 38.

To scan the extent of the inclusion 38, the turntable 34 on which the emitters 70 and 70' are mounted is rotated in the direction of the arrow 35, while the receivers 72 and 72' mounted on the second turntable 34' are moved along a predetermined path as shown by arrow 75, for example by ship, automobile, or aircraft. Maximum receiver signal is usually achieved when the axes of receivers 72 and 72' are aligned with the axes of the emitters 70 and 70' respectively. This may be utilized for initial acquisition and determination of the relative locations of the emitters 70 and 70' and receivers 72 and 72'. To minimize the divergence of the neutrino beams passing through the earth or oceans, the laser resonator mirrors of the laser media utilized in emitters 70 and 70' have curvatures that promote a non-divergent intra-cavity plane wave as nearly as possible. This may be achieved by placing the resonator end mirrors some distance away from the ends of the laser-active media, or by other known techniques to promote a non-divergent intra-cavity laser beam.

The relative dimensions of the various components shown in FIG. 9 are exaggerated for the sake of clarity of the illustration. In alternative embodiments the emitters 70 and 70' and receivers may be mounted side by side on other movable means such that they may be rotated about more than one axis, and path 75 may include motion along more than one axis.

Figure 10:
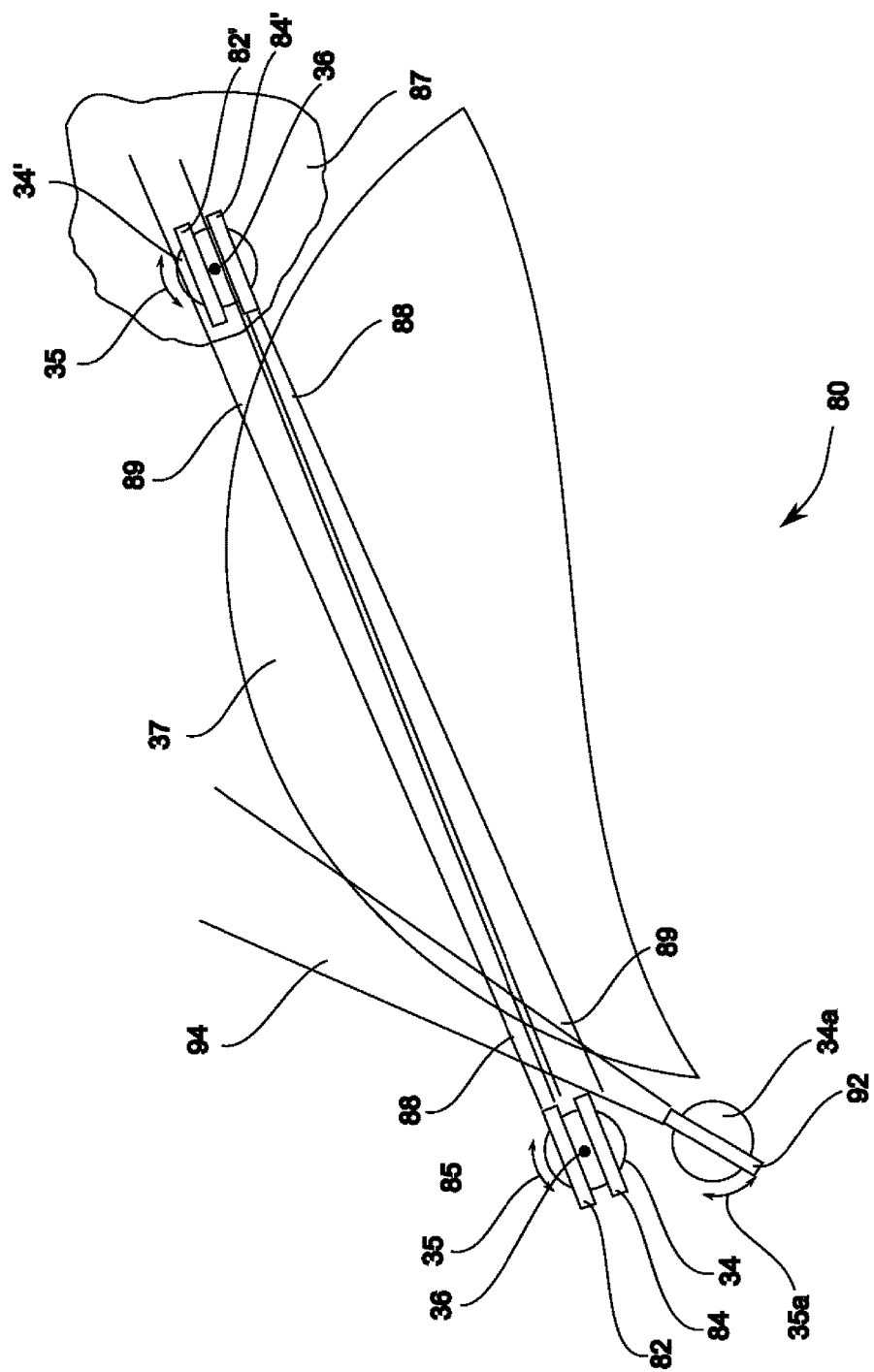
FIG. 10 is a schematic diagram showing another application of an emitter and receiver system as presented in the present application.

Turning to FIG. 10, a second arrangement/application 80 of the neutrino emitter and receiver systems of the present invention is shown. This embodiment 80 is useful for ship-to-shore, aircraft-to-tower, and similar communication and/or navigation systems. In this embodiment 80, neutrino beam emitter 82 similar to the emitter 70 described above and receiver 84 similar to the neutrino beam receiver 72 described above are mounted side by side on a steerable platform or turntable 34 at a geo-stationary location and a second system comprising a neutrino beam emitter 84' and receiver 82', similar to the emitter 82 and receiver 84, respectively, are mounted side by side on a platform or turntable 34' placed on for example, a moving vehicle 87. As before, the laser frequency of receiver 84 has a value equal to half the laser frequency of emitter 84' and receiver 82' has laser frequency equal to half the laser frequency utilized in emitter 82. In some embodiments the emitter 82 and receiver 82' of this embodiment 80 emit and detect neutrino and antineutrino beam 88 of a first frequency while the emitter 84' and receiver 84 of this embodiment 80 emit and detect a neutrino and antineutrino beam 89 at a second frequency different from the first frequency.

It will be appreciated, of course, that each of the neutrino-antineutrino beam emitters shown in FIGS. 9 and 10 may also incorporate any of the modulation structure, pumping structure, and information signal processor structures described above. Similarly, the neutrino-antineutrino beam receivers shown in FIGS. 9 and 10, may also incorporate any of the modulation structure, pumping structure, and information signal processor structures as described above. Similarly, more or less sophisticated information signal processing and/or modulation techniques may be employed depending on the desired application. For example, a very simple ON-OFF may be all that is required in some applications. Communication may be accomplished by any known means ranging from a Morse-code type modulation based upon relative ON-OFF times, to ultra-sophisticated encoding and decoding for communications applications.

In the embodiment 80 shown in FIG. 10, the axes of receivers 84 and 82' are preferably long compared to their lateral widths so that both the stationary set and mobile set can sense and determine the direction of the incoming neutrino and antineutrino beam whose signals are strongest when these beams are coaxial with the receivers. By rotating the emitter and receiver set of the mobile station in two planes in a standard search pattern with the direction of one or more of the stationary emitters held fixed, the mobile station can find and lock on to a stationary emitted neutrino beam. A maximum signal will be recorded by the mobile station's receiver when the axis of the receiver is aligned with the beam from the stationary emitter.

In some applications of embodiment 80 the embodiment may employ, in addition to the emitter 82 and receiver 84, a second emitter 92 which emits a beam of neutrinos and antineutrinos 94 having a frequency resonant to the laser used in receiver 82'. The emitter 92 is mounted on a turntable 34a and may be rotated in the direction of the arrow 35a. The emitter 92 is moved to execute a predetermined search pattern and emits the modulated neutrino and antineutrino beam 94 having information giving the earth-fixed coordinates of the emitters of neutrino beams 88 and 94 at each instant. When this beam 94 passes over the mobile station at 87, the coded signals in the neutrino beam 94 from the emitter 92 can be recorded and be interpreted by the mobile station's receiver 82' and its emitter beam 84' turned and directed at the stationary station a few instants later. After mutual lock-on, communications can be commenced between the two stations.

From the above it can be seen that the present invention not only teaches new means for wireless communications but also structures for practicing such communications. With respect to the above description then, it is to be realized that material disclosed in the applicant's drawings and description may be modified in certain ways while still producing the same result claimed by the applicant. Such variations are deemed readily apparent and obvious to one skilled in the art, and all equivalent relationships to those illustrated in the drawings and equations and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact disclosure shown and described, and accordingly, all suitable modifications and equivalents may be resorted to, falling within the scope of the invention.

I claim:
1. A neutrino communication system comprising:
   a. a first emitter means for generating a first coherent neutrino-antineutrino beam comprising a neutrino and antineutrino beam co-generated with lasing photons in a laser medium due to atomic transitions between no more than two atomic quantum energy levels;
   b. a first receiver means configured to receive said first coherent neutrino-antineutrino beam;
   c. wherein said first emitter means comprises a first laser operating at a first frequency, said first receiver means comprises a second laser operating at a second frequency wherein said second frequency is half the value of said first frequency, and,
   d. wherein said neutrino and antineutrino beams travel through solid matter selected from the group consisting of mountains, oceans, and the earth.

2. The neutrino communication system of claim 1 wherein:
   a. said first emitter means employs said first laser to generate said first coherent neutrino-antineutrino beam; and
   b. said first receiver means employs said second laser to receive said first coherent neutrino-antineutrino beam.

3. The neutrino communication system of claim 2 wherein:
   a. said neutrino and antineutrino beams are coaxial.

4. The neutrino communication system of claim 1 wherein:
   a. said first emitter means further comprises modulation means for modulating said first coherent neutrino-antineutrino beam to impress information thereon; and
   b. said first receiver means further comprises demodulation means to demodulate a signal received from said first coherent neutrino-antineutrino beam and extract said information.

5. The neutrino communication system of claim 4 wherein:
   a. said modulation and demodulation means employ at least one of: amplitude modulation, pulse duration modulation, frequency modulation; phase modulation, and polarization modulation.

6. The neutrino communication system of claim 1 further comprising:
   a. a second emitter means for generating a second coherent neutrino-antineutrino beam;

b. a second receiver means configured to receive said second coherent neutrino-antineutrino beam; and c. wherein said second emitter means comprises a third laser operating at a third frequency, said second receiver means comprises a fourth laser operating at a fourth frequency, said fourth frequency is half of said third frequency, and said third frequency is not equal to said first frequency.

7. The neutrino communication system of claim 6 wherein:

a. said second emitter means employs said third laser to generate said second coherent neutrino-antineutrino beam; and b. said second receiver means employs said fourth laser to receive said second coherent neutrino-antineutrino beam.

8. The neutrino communication system of claim 7 wherein:

a. said neutrino and antineutrino beams are coaxial.

9. The neutrino communication system of claim 1 wherein:

a. said first laser is a neodymium-doped yttrium-aluminum garnet laser operating at a wavelength of approximately 1.0615 micron; and b. said second laser is a holmium-doped erbium/thulium-yttrium-aluminum garnet laser operating at a wavelength of approximately 2.123 micron.

10. The neutrino communication system of claim 1 wherein:

a. said first laser is a CO laser operating in the vicinity of 5.3 micron; and b. said second laser is a CO2 laser operating in the vicinity of 10.6 micron.

11. The neutrino communication system of claim 1 wherein:

a. said first laser is operated at a high power; and b. said second laser is operated near threshold.

12. A neutrino communication system comprising:

a. a first emitter employing a first laser operating at a first frequency to generate a first coherent neutrino-antineutrino beam co-generated with lasing photons in a laser medium due to atomic transitions between no more than two atomic quantum energy levels;

b. a first receiver employing a second laser operating at one half of said first frequency to receive said first coherent neutrino-antineutrino beam; and c. wherein said neutrino and antineutrino beams travel through solid matter selected from the group consisting of mountains, oceans, and the earth.

13. The neutrino communication system of claim 12 wherein:

a. said neutrino and antineutrino beams are coaxial.

14. The neutrino communication system of claim 12 wherein:

a. said first emitter further comprises a modulator configured to encode information onto said first coherent neutrino-antineutrino beam; and b. said first receiver further comprises a demodulator configured to extract said information from a signal received from said first coherent neutrino-antineutrino beam.

15. The neutrino communication system of claim 14 wherein:

a. said modulator and demodulator employ at least one of: amplitude modulation, pulse duration modulation, frequency modulation; phase modulation, and polarization modulation.

16. The neutrino communication system of claim 12 wherein:

a. said first laser is operated at a high power; and b. said second laser is operated near threshold.

17. A method of neutrino communication comprising the steps of:

a. with a first laser operating at a first frequency, generating a coherent neutrino-antineutrino beam comprising a neutrino and antineutrino beam co-generated with lasing photons in a laser medium due to atomic transitions between no more than two atomic quantum energy levels;

b. with a second laser operating at one half of said first frequency, receiving said coherent neutrino-antineutrino beam; and c. wherein said neutrino and antineutrino beams travel through matter selected from the group consisting of mountains, oceans, and the earth.

18. The method of neutrino communication of claim 17 further comprising:

a. encoding information onto said coherent neutrino-antineutrino beam by modulating said coherent neutrino-antineutrino beam to create a modulated coherent neutrino-antineutrino beam;

b. generating a modulated signal from said modulated coherent neutrino-antineutrino beam; and c. extracting said information from said modulated signal demodulating said modulated signal.

19. The method of neutrino communication of claim 18 wherein:

a. said modulation and demodulation steps employ at least one of: amplitude modulation, pulse duration modulation, frequency modulation;

phase modulation, and polarization modulation.

20. The method of neutrino communication of claim 19 further comprising the steps of:

a. aligning said first laser and said second laser such that said first and second laser are coaxial with said neutrino-antineutrino beam; and b. aligning a third and fourth laser such that they are coaxial with a second neutrino-antineutrino beam.

* * * * *